(12) United States Patent
Yamaguchi et al.

(10) Patent No.: US 10,483,577 B2
(45) Date of Patent: Nov. 19, 2019

(54) COMPOSITE POLYMER ELECTROLYTE MEMBRANE, AND CATALYST-COATED MEMBRANE, MEMBRANE ELECTRODE ASSEMBLY, AND POLYMER ELECTROLYTE FUEL CELL USING THE COMPOSITE POLYMER ELECTROLYTE MEMBRANE

(71) Applicant: Toray Industries, Inc., Tokyo (JP)

(72) Inventors: Junpei Yamaguchi, Otsu (JP); Daisuke Izuhara, Otsu (JP); Hiroaki Umeda, Otsu (JP); Yumiko Okamoto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 211 days.

(21) Appl. No.: 15/557,217

(22) PCT Filed: Mar. 10, 2016

(86) PCT No.: PCT/JP2016/057590
§ 371 (c)(1),
(2) Date: Sep. 11, 2017

(87) PCT Pub. No.: WO2016/148017
PCT Pub. Date: Sep. 22, 2016

(65) Prior Publication Data
US 2018/0053956 A1    Feb. 22, 2018

(30) Foreign Application Priority Data

Mar. 13, 2015   (JP) ................... 2015-050409

(51) Int. Cl.
*H01M 8/00*    (2016.01)
*H01M 8/106*   (2016.01)
(Continued)

(52) U.S. Cl.
CPC .......... *H01M 8/106* (2013.01); *C08G 81/00* (2013.01); *H01B 1/122* (2013.01);
(Continued)

(58) Field of Classification Search
CPC .. H01M 8/106; H01M 8/1004; H01M 8/1053; H01M 8/1025; H01M 8/1027;
(Continued)

(56) References Cited

U.S. PATENT DOCUMENTS

2007/0003817 A1* 1/2007 Umeda ............... H01M 8/1004
429/483
2010/0196781 A1* 8/2010 Suzuki ................ H01M 2/1653
429/483

FOREIGN PATENT DOCUMENTS

JP    2003-031232 A    1/2003
JP    2005-216525 A    8/2005
(Continued)

*Primary Examiner* — Nicholas P D'Aniello
(74) *Attorney, Agent, or Firm* — DLA Piper LLP (US)

(57) ABSTRACT

A composite polymer electrolyte membrane includes a composite layer of an aromatic hydrocarbon-based polymer electrolyte and a fluorine-containing polymer porous membrane, wherein a ratio (O/F ratio) of an atomic composition percentage of oxygen O (at %) to an atomic composition percentage of fluorine F (at %) on an outermost surface of the fluorine-containing polymer porous membrane as measured by X-ray photoelectron spectroscopy (XPS) is 0.20 or more to 2.0 or less, and the aromatic hydrocarbon-based polymer electrolyte in the composite layer forms a phase separation structure.

15 Claims, 1 Drawing Sheet

(M1)

(M2)

(M3)

(M4)

(51) Int. Cl.
*C08G 81/00* (2006.01)
*H01B 1/12* (2006.01)
*H01M 8/1004* (2016.01)
*H01M 8/1025* (2016.01)
*H01M 8/1027* (2016.01)
*H01M 8/1032* (2016.01)
*H01M 8/1053* (2016.01)
*H01M 8/1072* (2016.01)
*H01M 8/1018* (2016.01)

(52) U.S. Cl.
CPC ....... *H01M 8/1004* (2013.01); *H01M 8/1025* (2013.01); *H01M 8/1027* (2013.01); *H01M 8/1032* (2013.01); *H01M 8/1053* (2013.01); *H01M 8/1072* (2013.01); *H01M 2008/1095* (2013.01); *H01M 2300/0082* (2013.01); *H01M 2300/0094* (2013.01)

(58) Field of Classification Search
CPC ............ H01M 8/1032; H01M 8/1072; H01M 2300/0094; H01M 2008/1095; H01M 2300/0082; H01B 1/122; H01B 1/06; C08G 81/00; C08G 2261/516; C08G 2261/3444; C08G 2261/312; C08G 2261/1452; C08G 65/4012; C08G 61/12; C08G 2261/412; Y02P 70/56
See application file for complete search history.

(56) References Cited

FOREIGN PATENT DOCUMENTS

| | | | |
|---|---|---|---|
| JP | 2008-007759 | A | 1/2008 |
| JP | 2008-311226 | A | 12/2008 |
| JP | 2009-009910 | A | 1/2009 |
| JP | 2010-232158 | A | 10/2010 |
| JP | 2011-054352 | A | 3/2011 |
| JP | 2013-062240 | A | 4/2013 |
| WO | 2008/018487 | A1 | 2/2008 |
| WO | 2013/031675 | A1 | 3/2013 |
| WO | 2013/140865 | A1 | 9/2013 |

\* cited by examiner

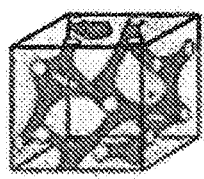 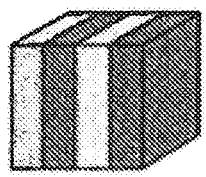 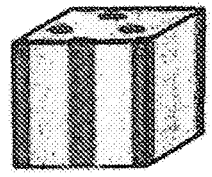 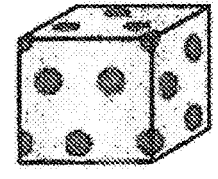
(M1)　　　(M2)　　　(M3)　　　(M4)

COMPOSITE POLYMER ELECTROLYTE MEMBRANE, AND CATALYST-COATED MEMBRANE, MEMBRANE ELECTRODE ASSEMBLY, AND POLYMER ELECTROLYTE FUEL CELL USING THE COMPOSITE POLYMER ELECTROLYTE MEMBRANE

TECHNICAL FIELD

This disclosure relates to a composite polymer electrolyte membrane having a composite layer of a polymer electrolyte and a polymer porous membrane; and a catalyst-coated membrane, a membrane electrode assembly, and a polymer electrolyte fuel cell, using the composite polymer electrolyte membrane.

BACKGROUND

A fuel cell is a kind of power generator that extracts electrical energy by electrochemically oxidizing fuel such as hydrogen and methanol and, in recent years, has been receiving attention as a clean energy supply source. Among them, a polymer electrolyte fuel cell has a low standard operating temperature of around 100° C., and further has a high energy density. Therefore, it is expected to be widely applied as a relatively small-scale distributed-type power generation facility, or a power generator of a moving body such as an automobile or a ship. In addition, a polymer electrolyte fuel cell has been receiving attention also as a power supply for small-size mobile apparatus and portable apparatus, and is expected to be mounted in a cellular phone, a personal computer or the like, replacing secondary batteries such as a nickel hydrogen battery and a lithium ion battery.

A fuel cell is usually constituted of a cell provided as a unit in which electrodes of an anode and a cathode where the reaction responsible for power generation occurs and a polymer electrolyte membrane that becomes a proton conductor between the anode and the cathode constitute a membrane electrode assembly (hereinafter, sometimes abbreviated as "MEA"), and the MEA is sandwiched between separators. The polymer electrolyte membrane is constituted mainly of a polymer electrolyte material.

As a required characteristic of the polymer electrolyte membrane, proton conductivity under a low humidity condition can be mentioned. Cost reduction for practical applications to a fuel cell for an automobile, a fuel cell for domestic use or the like has been considered. By using a polymer electrolyte membrane having sufficient proton conductivity under a low humidity condition, the operation can be performed at a high temperature exceeding 80° C. under the low humidity condition of a relative humidity of 60% or less, and the water management system can be simplified.

Conventionally, as the polymer electrolyte membrane, Nafion (registered trademark, manufactured by E. I. du Pont de Nemours and Company) that is a perfluorosulfonic acid-based polymer has been widely used. Nafion (registered trademark) exhibits high proton conductivity under a low humidity condition through a proton conduction channel due to the cluster structure, but on the other hand is extremely expensive because of being produced through a multi-stage synthesis. Further, there has been a problem that fuel crossover is large due to the cluster structure described above. In addition, in a fuel cell operating condition, a wet-dry cycle is repeated, and a polymer electrolyte membrane repeats swelling and shrinkage. At that time, since the electrolyte membrane is constrained of a separator or the like, there has been a problem that the membrane is broken due to local stress concentration, and the mechanical strength or physical durability of the membrane are lost. Moreover, a problem that the electrolyte membrane has a low softening point and cannot be used at high temperature, a problem of waste disposal after use, and a problem that material recycling is difficult, have been pointed out.

To overcome such problems, a hydrocarbon-based polymer electrolyte membrane that is inexpensive and excellent in the membrane properties, and can replace Nafion (registered trademark) has been actively developed in recent years.

Among them, in particular, to achieve both of proton conductivity under a low humidity condition and mechanical durability of the electrolyte membrane, an attempt focused on a phase separation structure has been made. For example, in WO 2013/031675, a crystalline polyether ketone (PEK)-based polymer electrolyte membrane having a phase separation structure has been proposed. Further, for the purpose of suppressing the dimensional change accompanying the wet-dry cycle of an electrolyte membrane, an attempt focused on the combination of a reinforcing material with an electrolyte membrane has been made. For example, in JP 2013-62240 and JP 2010-232158, a composite polymer electrolyte membrane in which an electrolyte membrane is reinforced with a porous material or fiber nonwoven fabric made of polytetrafluoroethylene has been proposed.

However, we found that the following problems exist in the conventional techniques. The electrolyte membrane described in WO '675 has achieved the high mechanical strength due to a pseudo-crosslinking effect by strong crystallinity while maintaining high proton conductivity under a low humidity condition due to the phase separation structure. But even with this technique, the reduction effect of dimensional change in wet-dry cycle is not sufficient, and further improvement of the physical durability has been required.

In contrast, in JP '240 and JP '158, for the similar purpose, a hydrocarbon-based electrolyte is reinforced with a fluorine-containing porous membrane, but since the hydrophilization treatment for the fluorine-containing porous membrane is insufficient, affinity between the hydrocarbon-based electrolyte and the fluorine-containing porous material is poor, and a large number of voids are present in the obtained composite electrolyte membrane. Therefore, there has been a problem with fuel permeation and mechanical strength.

It could therefore be helpful to provide a polymer electrolyte membrane having excellent proton conductivity even under low humidity and low temperature conditions, further is excellent in mechanical strength and physical durability, and is capable of achieving high power, high energy density, and long-term durability when being used as a polymer electrolyte fuel cell; and a membrane electrode assembly and a polymer electrolyte fuel cell, using the polymer electrolyte membrane.

SUMMARY

We thus provide a composite polymer electrolyte membrane including a composite layer of an aromatic hydrocarbon-based polymer electrolyte and a fluorine-containing polymer porous membrane, in which a ratio (O/F ratio) of an atomic composition percentage of oxygen O (at %) to an atomic composition percentage of fluorine F (at %) on the outermost surface of the fluorine-containing polymer porous membrane as measured by X-ray photoelectron spectroscopy (XPS) is 0.2 or more to 2.0 or less, and further the aromatic hydrocarbon-based polymer electrolyte in the composite layer forms a phase separation structure.

A polymer electrolyte membrane that has excellent proton conductivity even under a low humidity condition, further is excellent in mechanical strength and physical durability, and is capable of achieving high power, and long-term durability when being used as a polymer electrolyte fuel cell; and a catalyst-coated membrane, a membrane electrode assembly, and a polymer electrolyte fuel cell, using the polymer electrolyte membrane.

BRIEF DESCRIPTION OF THE DRAWING

FIG. 1 is a schematic view showing each pattern of a phase separation structure of an aromatic hydrocarbon-based polymer electrolyte.

DETAILED DESCRIPTION

Hereinafter, the expression "to" between numerical values represents a range including the numerical values at both sides of the "to."

Aromatic Hydrocarbon-Based Polymer Electrolyte

An aromatic hydrocarbon-based polymer electrolyte (hereinafter, may also be simply referred to as a "polymer electrolyte") is characterized by forming a phase separation structure in a composite layer described later. The phase separation structure can be developed in a polymer formed by bonding two or more kinds of segments that are incompatible with one another to one another, for example, a block copolymer or a graft copolymer, or a polymer blend prepared by mixing two or more kinds of polymers that are incompatible with one another to one another.

A block copolymer or a graft copolymer that can be used as the aromatic hydro-carbon-based polymer electrolyte is constituted of bonding a segment containing an ionic group to a segment not containing an ionic group. The expression "segment" is a partial structure in a copolymer chain composed of repeating units showing specific properties, and represents a segment having a molecular weight of 2000 or more. In addition, a polymer blend that can be used as the aromatic hydrocarbon-based polymer electrolyte is constituted of mixing a polymer containing an ionic group with a polymer not containing an ionic group. The expression "polymer" represents the entire polymer chain having a molecular weight of 10000 or more.

As an aromatic hydrocarbon-based polymer electrolyte, from the viewpoint of achieving a balance between the power generation performance and the physical durability, a block copolymer or a graft copolymer is preferred. By using a block copolymer or a graft copolymer, a phase separation structure having a domain (mass formed by aggregation of similar segments or similar polymers) finer than that of a polymer blend can be formed, and more excellent power generation performance and physical durability can be achieved. Further, in view of capable of forming a more uniform phase separation structure, the aromatic hydrocarbon-based polymer electrolyte is most preferably a block copolymer.

A segment or polymer containing an ionic group is referred to as (A1), and a segment or polymer not containing an ionic group is referred to as (A2). However, the expression "not containing an ionic group" does not exclude an example in which the segment or polymer contains ionic groups in a small amount within a range not inhibiting the formation of a co-continuous phase separation structure.

Since the aromatic hydrocarbon-based polymer electrolyte forms a phase separation structure, a favorable proton conduction channel is formed in a domain containing (A1) (hereinafter referred to as an "ionic domain"), and at the same time, favorable mechanical strength and fuel barrier properties can be expressed in a domain containing (A2) (hereinafter, referred to as a "nonionic domain").

The phase separation structure form of the aromatic hydrocarbon-based polymer electrolyte is largely classified into four patterns of co-continuous (M1), lamellar (M2), cylinder (M3), and sea-island (M4) (FIG. 1). The phase separation structure is described on, for example, p. 525, 41, 1990, Annual Review of Physical Chemistry (Annual Review of Physical Chemistry). As the phase separation structure of the aromatic hydrocarbon-based polymer electrolyte, from the viewpoint of the balance between the proton conductivity and the mechanical strength, a co-continuous pattern or a lamellar pattern are preferred, and from the viewpoint of the proton conduction path construction, a co-continuous pattern is most preferred. When the phase separation structure form is a cylinder pattern or a sea-island pattern, the proton conductivity may be lowered due to the small amount of the ionic groups responsible for proton conduction or, conversely, the mechanical strength is lowered due to the increased amount of the ionic groups.

We confirmed that the aromatic hydrocarbon-based polymer electrolyte forms a phase separation structure by observing the phase separation structure when the transmission electron microscope (TEM) observation is performed at 50000 times. Specifically, as long as the average distance between domains of the phase separation structure is 2 nm or more, the aromatic hydrocarbon-based polymer electrolyte can be regarded as having a phase separation structure. The average distance between domains is defined as the value obtained from the average value of the respective distances between domains measured from the TEM image to which image processing has been applied. The average distance between domains is preferably 2 nm or more to 5000 nm or less, and more preferably 5 nm or more to 2000 nm or less from the viewpoint of proton conductivity, mechanical strength, and physical durability. When the average distance between domains is smaller than 2 nm, the phase separation structure becomes unclear, and there may be a case where a favorable proton conduction channel is not formed. On the other hand, when the average distance between domains is larger than 5000 nm, although the proton conduction channel is formed, but the mechanical strength and the physical durability may become poor due to swelling. Note that the measurement of the average distance between domains is performed by the method described in item (5) in Examples.

In addition, the discrimination of the phase separation structure form is performed with regard to the three-dimensional image obtained by TEM tomography observation by comparing the patterns with each other shown by the respective three digital slice images obtained by cutting in the three directions of length, width, and height. For example, in the polymer electrolyte membrane including an aromatic hydrocarbon-based polymer electrolyte that contains the above-described (A1) and (A2), when the phase separation structure has a co-continuous pattern or a lamellar pattern, an ionic domain containing (A1) and a nonionic domain containing (A2) both form a continuous phase in all of the three images. In a co-continuous pattern, a pattern complicated by respective continuous phases is exhibited, and in a lamellar pattern, a pattern connecting continuous layers in a layer form is exhibited. In the cylinder structure or the sea-island structure, any one of the domains described above does not form a continuous phase at least in one image. The expression "continuous phase" means a phase in which individual domains are not isolated but linked to each other in a macroscopic view. However, it does not matter if there is a part not linked partly.

Further, in the TEM observation or the TEM tomography, to clarify the aggregation states of the ionic domain and the nonionic domain or the contrast between the ionic domain and the nonionic domain, a sample in which an ionic group has been ion-exchanged with lead by immersing an electrolyte membrane in a 2 wt % lead acetate aqueous solution for 2 days is preferably used.

The volume ratio of the ionic domain to the nonionic domain in the aromatic hydrocarbon-based polymer electrolyte is preferably 80/20 to 20/80, and more preferably 60/40 to 40/60. When outside the range described above, there the proton conductivity may become insufficient, or the dimensional stability or mechanical properties may become insufficient. In the aromatic hydrocarbon-based polymer electrolyte, the molar composition ratio (A1/A2) of (A1) to (A2) is preferably 0.20 or more, more preferably 0.33 or more, and furthermore preferably 0.50 or more. In addition, A1/A2 is preferably 5.00 or less, more preferably 3.00 or less, and furthermore preferably 2.50 or less. When the A1/A2 is less than 0.20 or exceeding 5.00, the proton conductivity may become insufficient under a low humidity condition, or the hot water resistance or the physical durability may become insufficient. Therefore, this is not preferred. The expression "molar composition ratio A1/A2" is referred to as the ratio of the number of moles of the repeating units existing in (A1) to the number of moles of the repeating units existing in (A2). The expression "the number of moles of the repeating units" is referred to as the value obtained by dividing the number average molecular weight of (A1) or (A2) by the molecular weight of the corresponding constituent unit.

In addition, to obtain sufficient dimensional stability, mechanical strength, physical durability, fuel barrier properties, and solvent resistance, it is more preferred that the aromatic hydrocarbon-based polymer electrolyte has crystallinity. The expression "having crystallinity" means that the polymer electrolyte has a crystallizable property capable of crystallizing the polymer electrolyte when the temperature of the polymer electrolyte is increased, or that the polymer electrolyte has already crystallized.

Confirmation of the crystallinity is performed by differential scanning calorimetry (DSC), or wide angle X-ray diffraction. It is preferred that the polymer electrolyte membrane exhibits a heat quantity of crystallization of 0.1 J/g or more as measured by the differential scanning calorimetry, or exhibits a degree of crystallinity of 0.5% or more as measured by the wide angle X-ray diffraction. That is, when a crystallization peak is not observed by differential scanning calorimetry, it may already be crystallized and the polymer electrolyte may be amorphous. But when already crystallized, the degree of crystallinity becomes 0.5% or more by wide angle X-ray diffraction.

In the aromatic hydrocarbon-based polymer electrolyte having the crystallinity as described above, workability of the polymer electrolyte membrane may be poor. In that case, a protecting group may be introduced into the aromatic hydrocarbon-based polymer electrolyte to temporarily suppress crystallinity. Specifically, by combining the aromatic hydrocarbon-based polymer electrolyte with a fluorine-containing polymer porous membrane described later in a state in which a protecting group has been introduced into the polymer electrolyte, and then by performing the deprotection, a composite layer of an aromatic hydrocarbon-based polymer electrolyte having crystallinity and a fluorine-containing polymer porous membrane can be formed. As the ionic group possessed by the aromatic hydrocarbon-based polymer electrolyte, a group having proton exchange capability may be used, and a sulfonic acid group, a sulfonimide group, a sulfuric acid group, a phosphonic acid group, a phosphoric acid group, or a carboxylic acid group is preferably used.

Two or more kinds of these ionic groups may be contained in an aromatic hydrocarbon-based polymer electrolyte, and the combination is appropriately determined depending on the structure and the like of the polymer. Among them, from the viewpoint of high proton conductivity, it is more preferred that the aromatic hydrocarbon-based polymer has at least a sulfonic acid group, a sulfonimide group, or a sulfuric acid group, and from the viewpoint of raw material cost, it is most preferred to have at least a sulfonic acid group. The ion exchange capacity (IEC) of the aromatic hydrocarbon-based polymer electrolyte as a whole is in view of the balance between the proton conductivity and the water resistance, preferably 0.1 meq/g or more to 5.0 meq/g or less. The IEC is more preferably 1.4 meq/g or more, and furthermore preferably 2.0 meq/g or more. Further, the IEC is more preferably 3.5 meq/g or less, and furthermore preferably 3.0 meq/g or less. When the IEC is smaller than 0.1 meq/g, the proton conductivity may become insufficient, and when the IEC is larger than 5.0 meq/g, the water resistance may become insufficient.

In addition, it is preferred that the IEC of (A1) is high from the viewpoint of the proton conductivity under a low humidity condition. Specifically, the IEC of (A1) is preferably 2.5 meq/g or more, more preferably 3.0 meq/g or more and, furthermore, preferably 3.5 meq/g or more. Further, as the upper limit, the IEC of (A1) is preferably 6.5 meq/g or less, more preferably 5.0 meq/g or less and, furthermore, preferably 4.5 meq/g or less. When the IEC of (A1) is less than 2.5 meq/g, the proton conductivity under a low humidity condition may become insufficient, and when the IEC of (A1) exceeds 6.5 meq/g, the hot water resistance or the physical durability may become insufficient.

It is preferred that the IEC of (A2) is low from the viewpoint of hot water resistance, mechanical strength, dimensional stability, and physical durability. Specifically, the IEC of (A2) is preferably 1.0 meq/g or less, more preferably 0.5 meq/g or less and, furthermore, preferably 0.1 meq/g or less. When the IEC of (A2) exceeds 1.0 meq/g, the hot water resistance, mechanical strength, dimensional stability, or physical durability may become insufficient.

The expression "IEC" is referred to as the molar amount of the ionic groups introduced per unit dry weight of the aromatic hydrocarbon-based polymer electrolyte, and the polymer electrolyte membrane, and it is indicated that as this value is larger, the introduction amount of ionic groups is larger. The IEC is defined as the value determined by a neutralization titration method. The calculation of the IEC by a neutralization titration is performed according to the method described in item (3) in Examples.

Hereinafter, an aromatic hydrocarbon-based polymer used for the polymer electrolyte membrane will be described with specific preferred examples.

Examples of the main chain skeleton of the aromatic hydrocarbon-based polymer electrolyte include polysulfone, polyethersulfone, polyphenylene oxide, polyarylene ether-based polymer, polyphenylene sulfide, polyphenylene sulfide sulfone, polyparaphenylene, polyarylene-based polymer, polyarylene ketone, polyether ketone, polyarylene phosphine oxide, polyether phosphine oxide, polybenzoxazole, polybenzthiazole, polybenzimidazole, polyamide, polyimide, polyetherimide, and polyimidesulfone. The polysulfone, polyethersulfone, polyether ketone and the like referred to herein are generic terms for polymers having a sulfone bond, an ether bond, and a ketone bond, respectively in the molecule chain, and include polyether ketone ketone, polyether ether ketone, polyether ether ketone ketone, polyether ketone ether ketone ketone, polyether ketone sulfone, and the like. Further, the main chain skeleton of the aromatic hydrocarbon-based polymer electrolyte may be a polymer structure containing multiple polymer structures described above.

Among them, in particular, a polyether ketone-based polymer is preferred, and a polyether ketone-based block copolymer that contains a segment including a constituent unit (S1) containing an ionic group as described below and a segment including a constituent unit (S2) not containing an ionic group is more preferred.

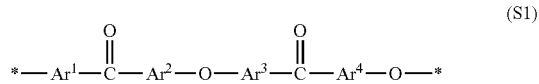
(S1)

In general formula (S1), each of $Ar^1$ to $Ar^4$ represents an arbitrary divalent arylene group, $Ar^1$ and/or $Ar^2$ contains an ionic group, and each of $Ar^3$ and $Ar^4$ may or may not contain an ionic group. Each of $Ar^1$ to $Ar^4$ may be arbitrarily substituted, and two or more kinds of arylene groups may be independently used for each of $Ar^1$ to $Ar^4$. The symbol * represents a binding site with general formula (S1) or with another constitutional unit.

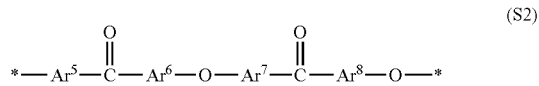
(S2)

In general formula (S2), each of $Ar^5$ to $Ar^8$ represents an arbitrarily divalent arylene group, and may be arbitrarily substituted, but does not contain any ionic groups. For each of $Ar^5$ to $Ar^8$, two or more kinds of arylene groups may be used independently. The symbol * represents a binding site with general formula (S2) or with another constitutional unit.

Examples of the divalent arylene group preferred as each of $Ar^1$ to $Ar^8$ include a hydrocarbon-based arylene group such as a phenylene group, a naphthylene group, a biphenylene group, and a fluorenediyl group; and a heteroarylene group such as pyridinediyl, quinoxalinediyl, and thiophenediyl, but are not limited thereto. In addition, substitution with a group other than ionic groups may be performed, but unsubstituted ones are more preferred from the viewpoint of proton conductivity, chemical stability, and physical durability. Further, a phenylene group, and a phenylene group containing an ionic group are preferred, and a p-phenylene group, and a p-phenylene group containing an ionic group are most preferred.

Fluorine-Containing Polymer Porous Membrane

With regard to the composite polymer electrolyte membrane, by having a composite layer formed by combining an aromatic hydrocarbon-based polymer electrolyte with a fluorine-containing polymer porous membrane (hereinafter, may be simply referred to as "porous membrane"), excellent mechanical strength and physical durability provided by the domain containing the above-described (A2) are further improved.

The fluorine-containing polymer porous membrane is a membrane member including a fluorine-containing polymer in which at least part of the hydrogen atoms (H) have been substituted with fluorine atoms (F) in a chemical structure of an aliphatic hydrocarbon-based polymer or an aromatic hydrocarbon-based polymer. As the fluorine-containing polymer, a polymer in which 50% or more of the hydrogen atoms (H) in the chemical structure of the polymer have been substituted with fluorine atoms (F) is preferred. As the fluorine-containing polymer, polytetrafluoroethylene (PTFE), polytetrafluoroethylene-hexafluoropropylene (FEP), polytetrafluoroethylene-perfluoropropylvinyl ether (PFA), polychlorotrifluoroethylene, polytetrafluoroethylene-perfluoro-2,2-dimethyl-1,3-dioxole, polyperfluorobutenylvinyl ether, or the like is preferably used, and from the viewpoint of the balance between mechanical strength and percentage of voids, polytetrafluoroethylene is most preferably used.

The porous structure in the fluorine-containing polymer porous membrane is not particularly limited as long as it is capable of being combined with the above-described aromatic hydrocarbon-based polymer electrolyte. However, from the viewpoint of improving the mechanical strength and physical durability of a composite polymer electrolyte membrane, a continuous porous structure (sponge structure) in which a frame and a void in a porous structure respectively form a continuous structure, a woven fabric structure, or a nonwoven fabric structure is mentioned as a preferred example.

The thickness of the porous membrane is not particularly limited and should be determined depending on the application of a composite polymer electrolyte membrane. However, the thickness with which the porous membrane is practically used is 5 to 50 μm.

The percentage of voids of the porous membrane before combining with an aromatic hydrocarbon-based polymer electrolyte is not particularly limited, and from the viewpoint of achieving a balance between the proton conductivity and the mechanical strength of the obtained composite polymer electrolyte membrane, is preferably 50 to 95%, and more preferably 80 to 95%. Note that the percentage of voids Y1 (% by volume) of the porous membrane is defined as the value determined by the mathematical formula below:

$$Y1=(1-Db/Da)\times 100.$$

In the formula, Da is a specific gravity of the material constituting a porous membrane (for example, in a porous membrane made of polytetrafluoroethylene, a specific gravity of polytetrafluoroethylene itself), and Db is a specific gravity of the entire porous membrane including the void part.

As the porous membrane, a porous membrane having a ratio (O/F ratio) of the atomic composition percentage O (at %) of oxygen to the atomic composition percentage F (at %) of fluorine on the outermost surface of 0.20 or more to 2.0 or less is used. We found that when a composite layer is formed by using a fluorine-containing polymer porous membrane having an O/F ratio in this range, an aromatic hydrocarbon-based polymer electrolyte can be combined at a high filling rate in the voids of a fluorine-containing polymer porous membrane while maintaining the uniform phase separation structure. When the O/F ratio on the outermost surface is less than 0.20, the difference in the surface energy between the aromatic hydrocarbon-based polymer electrolyte and the fluorine-containing polymer porous membrane is large, and the filling rate in the composite layer tends to be lowered. Further, when the O/F ratio on the outermost surface is larger than 2.0, there may be a case where the uniform phase separation structure is not observed in the composite electrolyte membrane using the porous membrane. The details are unknown, but we presume that the affinity between (A1) that is a hydrophilic component in a polymer and the fluorine-containing polymer porous membrane becomes remarkably high, as a result of which (A1) is unevenly distributed in the vicinity of the fluorine-containing polymer porous membrane, and a uniform phase separation structure is not formed. The O/F ratio on the outermost surface of the fluorine-containing polymer porous membrane is more preferably 0.30 or more to 1.5 or less, and furthermore preferably 0.40 or more to 1.0 or less.

The expression "outermost surface" of a porous membrane is referred to as not only the surface layer when a porous membrane is observed in a macroscopic view (hereinafter, simply referred to as "surface layer"), but also all of the surfaces of the porous membrane which are in contact with the outside, including the surface of the frame. However, the O/F ratio as measured the surface layer of the porous membrane by X-ray photoelectron spectroscopy (XPS) is regarded as the O/F ratio on the outermost surface of the porous membrane.

On the other hand, when the O/F ratio inside the frame of the porous structure is increased, the strength of the porous membrane tends to be decreased. Therefore, it is preferred that as the porous body, the outermost surface of the porous membrane has the O/F ratio described above, and further the O/F ratio inside the frame is smaller than the O/F ratio of the surface layer. Specifically, the O/F ratio as measured the surface layer of the porous membrane by XPS is preferably 0.20 or more and, further, the porous membrane is made into powder by freeze pulverizing. Then, when the powder is measured by XPS, the O/F ratio is preferably less than two thirds of the O/F ratio as measured the surface layer by XPS. The XPS measurement value of the freeze-pulverized powder is the value reflecting both of the O/F ratio on the outermost surface of the porous membrane and the O/F ratio inside the frame of the porous structure. The O/F ratio of powder is more preferably one third or more to less than two thirds of the O/F ratio of the surface layer.

The O/F ratios of the surface layer and powder of the porous membrane are calculated specifically by the method described in item (2) in the Examples. Also, in the state of the composite polymer electrolyte membrane after being combined with a polymer electrolyte, only the porous membrane is taken out by extracting the polymer electrolyte with a solvent, and the O/F ratio can be measured in a similar way.

The porous membrane having the O/F ratio as described above can be prepared by the hydrophilization treatment in which a hydrophilic group containing an oxygen atom such as a hydroxy group or a sulfonic acid group is introduced on the frame surface of a porous structure, and the larger O/F ratio means higher degree of the hydrophilicity. Further, the hydrophilization treatment will be described later.

Composite Polymer Electrolyte Membrane

The composite polymer electrolyte membrane has a composite layer of the aromatic hydrocarbon-based polymer electrolyte described above and the fluorine-containing polymer porous membrane described above. The expression "combining" means that a polymer electrolyte is filled in voids of a porous membrane and solidified, and the polymer electrolyte is integrated with the porous membrane.

The filling rate of a polymer electrolyte in a composite layer is preferably 50% or more, and more preferably 60% or more. When the filling rate of the composite layer is lowered, the conduction path of protons is lost, and a problem that power generation performance is deteriorated is caused. In addition, the fluorine-containing polymer porous membrane may also be a fluorine-containing polymer porous membrane obtained by laminating two or more kinds of fluorine-containing polymer porous membranes having a filling rate different from each other. The filling rate of a polymer electrolyte in a composite layer is the value calculated by the IEC, and specifically by the method described in item (4) in the Examples.

In the composite polymer electrolyte membrane, the dimensional change rate in the in-plane direction can be reduced by having a composite layer. The dimensional change rate refers to an indicator representing the change between the dimension of the composite polymer electrolyte membrane in a dry state and the dimension of the composite polymer electrolyte membrane in a wet state, and the specific measurement is performed by the method described in item (6) in the Examples. Due to the small dimensional change in the in-plane direction, for example, when the composite polymer electrolyte membrane is used in a fuel cell, the stress caused by the swelling and shrinkage occurring in the edge part and the like of the electrolyte membrane during wet-dry cycle is reduced, and the durability can be improved. The dimensional change rate $\lambda xy$ in the in-plane direction of a composite polymer electrolyte membrane is preferably 10% or less, more preferably 8% or less, and most preferably 5% or less.

In addition, in the composite polymer electrolyte membrane, the anisotropy of the dimensional change rate in the in-plane direction can be reduced by having a composite layer. When the anisotropy of the dimensional change rate is large, the cell design of the fuel cell is constrained or the stress caused by swelling and shrinkage is concentrated on the edge of the electrolyte membrane in a direction perpendicular to the direction in which the dimensional change is large and breakage of the electrolyte membrane may be easily started from that part in some cases. It is preferred that the ratio $\lambda_{MD}/\lambda_{TD}$ of the dimensional change rate $\lambda_{MD}$ in the MD direction to the dimensional change rate $\lambda_{TD}$ in the TD direction, in the in-plane direction of the composite polymer electrolyte membrane satisfies $0.5<\lambda_{MD}/\lambda_{TD}<2.0$.

Further, for the similar reason, in the composite polymer electrolyte membrane, the anisotropy of the elastic modulus and the yield stress in the MD/TD direction can also be reduced.

The thickness of a composite layer in the composite electrolyte membrane is not particularly limited, and is preferably 0.5 µm or more to 50 µm or less, and more preferably 2 µm or more to 40 µm or less. In having a thick composite layer, while the physical durability of the electrolyte membrane is improved, the membrane resistance tends to be increased. In a case of having a thin composite layer, while the power generation performance is improved, there is a tendency that a problem in the physical durability is caused, and a problem of electrical short circuit, fuel permeation or the like is caused.

The membrane thickness of the entire composite polymer electrolyte membrane containing a composite layer is not particularly limited and, usually, a composite polymer electrolyte membrane having a membrane thickness of 3 µm or more to 200 µm or less is suitably used. To obtain the membrane strength enough for practical use, the membrane thickness is preferably 3 μm or more, and to reduce the membrane resistance and improve the power generation performance, the membrane thickness is preferably 200 μm or less. The membrane thickness of the entire composite polymer electrolyte membrane is more preferably 5 μm or more to 150 μm or less, furthermore preferably 10 μm or more to 100 μm or less, and most preferably 10 μm or more to 50 μm or less.

In addition, the composite polymer electrolyte membrane may also be an electrolyte membrane formed only of a composite layer, and may also have a layer formed only of a polymer electrolyte and being in contact with either both sides or one side of the composite layer. By having such a layer, the adhesiveness between the composite polymer electrolyte membrane and the electrode is improved, and the interfacial peeling can be suppressed. When the composite polymer electrolyte membrane is formed by bringing a layer or layers formed only of a polymer electrolyte in contact with one side or both sides of the composite layer, as the polymer electrolyte of the layer, the same as or different from the polymer electrolyte used for the composite layer may be used, and the same polymer electrolyte is preferably used.

Further, in the composite polymer electrolyte membrane, for the purpose of improving mechanical strength, thermal stability of ionic groups, water resistance, solvent resistance, radical resistance, coating properties of coating liquid, and storage stability, a crosslinking agent, or an additive agent used for ordinary high molecular compounds such as a crystallization nucleating agent, a plasticizer, a stabilizer, a release agent, an antioxidant, a radical scavenger, and inorganic fine particles, may be contained within our range but not contrary to the desired effect.

Method of Producing Composite Polymer Electrolyte Membrane

The composite polymer electrolyte membrane can be produced by a method of producing a composite polymer electrolyte membrane characterized by combining a fluorine-containing polymer porous body having an O/F ratio on the outermost surface of 0.20 or more to 2.0 or less as measured by XPS with an aromatic hydrocarbon-based polymer electrolyte. Adjustment of the O/F ratio on the outermost surface of a porous body is performed by hydrophilization treatment. As the preferred hydrophilization treatment, chemical etching and plasma treatment can be mentioned.

In chemical etching, as an etching solution, a metal sodium-naphthalene complex solution is preferably used. In this case, to control the O/F ratio on the outermost surface of a porous structure to 0.20 or more to 2.0 or less, it is preferred that the temperature of the metal sodium-naphthalene complex solution is set to 10° C. or less. In addition, by setting the concentration of the metal sodium-naphthalene complex solution to 1% by mass or less, and further setting the contact time of the metal sodium-naphthalene complex solution with the porous membrane before hydrophilization to around 10 seconds, the hydrophilization inside the frame of the porous structure is prevented, and the O/F ratio inside the frame can be maintained at less than 0.20. Further, since the metal sodium-naphthalene complex is deteriorated due to the moisture or oxygen in the atmospheric air, it is preferred that the treatment is performed in a glove box in which the moisture content and oxygen concentration in the atmosphere have been reduced.

In plasma treatment, when general atmospheric pressure plasma or plasma from an oxygen mixed gas is used, the mechanical strength may be remarkably reduced. Therefore, it is preferred that the RF output voltage is 10 W or less. At the low RF output voltage as described above, when the oxygen concentration exceeds 5%, the plasma becomes remarkably unstable, and there is a tendency that the degree of hydrophilicity cannot be controlled with satisfactory reproducibility. Therefore, it is preferred that a mixed gas having an oxygen partial pressure of 5% or less is used. In addition, by controlling the mixed gas introduction pressure to around 10 Pa, the plasma tends to be stabilized. Further, also by controlling the treatment time in an extremely short time of 3 minutes or less, the degree of hydrophilicity can be controlled. Furthermore, when the oxygen partial pressure in the mixed gas fluctuates, the treatment strength fluctuates, therefore, to control the degree of hydrophilicity with satisfactory reproducibility, it is preferred that the inside of the chamber is maintained at a vacuum of 1 Pa or less, and then the mixed gas is introduced.

In addition, in hydrophilization treatment in which a dilute solution containing a hydrophilic resin is introduced in a porous body and then drying and sintering are performed, the hydrophilic resin is flown out when the porous body is processed into a composite polymer electrolyte membrane and is uses as an electrolyte membrane of a fuel cell, and cracks may be generated at the interface between the porous body structure and the polymer electrolyte in some cases. Generation of cracks can be predicted by measuring weight of an eluate with hot water after the composite electrolyte membrane has been immersed in hot water at 80° C. for one week. When the composite polymer electrolyte membrane is subjected to the hydrophilization treatment as described above, the weight of an eluate with hot water can be kept to 1% or less to the weight of the composite polymer electrolyte membrane before the hot water immersion, and the generation of cracks is decreased.

Next, the prepared porous membrane and aromatic hydrocarbon-based polymer electrolyte as described above are combined with each other.

As a method of combining the aromatic hydrocarbon-based polymer electrolyte and the fluorine-containing polymer porous membrane with each other, a method in which voids of a porous membrane are impregnated with a solution of a polymer electrolyte, and the solvent is dried to produce a composite polymer electrolyte membrane can be mentioned. Specifically, (1) a method in which an excessive solution of a polymer electrolyte is removed while pulling up a porous membrane immersed in a solution of the polymer electrolyte, and the membrane thickness is controlled, (2) a method in which a solution of a polymer electrolyte is applied onto a porous membrane by casting, and (3) a method in which a porous membrane is bonded to a support substrate onto which a solution of a polymer electrolyte has been applied by casting to be impregnated with the solution of the polymer electrolyte, can be mentioned. In addition, also in methods (1) and (2), a method in which a fluorine-containing porous material is bonded onto a support substrate prepared separately and a solvent in an aromatic hydrocarbon-based polymer electrolyte is dried is preferred from the viewpoint of improving the membrane quality because wrinkles and uneven thickness of the composite polymer electrolyte membrane can be reduced.

A solvent to be used for a solution of the aromatic hydrocarbon-based polymer electrolyte can be appropriately selected depending on the polymer type. For example, an aprotic polar solvent such as N,N-dimethylacetamide, N,N-dimethylformamide, N-methyl-2-pyrrolidone, dimethyl sulfoxide, sulfolane, 1,3-dimethyl-2-imidazolidinone, and hexamethyl-phosphonetriamide; an ester-based solvent such as γ-butyrolactone, ethyl acetate, and butyl acetate; a carbonate-based solvent such as ethylene carbonate, and propylene carbonate; or an alkylene glycol monoalkyl ether such as ethylene glycol monomethyl ether, ethylene glycol monoethyl ether, propylene glycol monomethyl ether, and propylene glycol monoethyl ether is suitably used, and these may be used alone or as a mixture of two or more kinds thereof.

Further, to adjust the viscosity of the polymer electrolyte, an alcohol-based solvent such as methanol, ethanol, 1-propanol, and isopropyl alcohol; a ketone-based solvent such as acetone, methyl ethyl ketone, and methyl isobutyl ketone; an ester-based solvent such as ethyl acetate, butyl acetate, and ethyl lactate; a hydrocarbon-based solvent such as hexane, and cyclohexane; an aromatic hydrocarbon-based solvent such as benzene, toluene, and xylene; a halogenated hydrocarbon-based solvent such as chloroform, dichloromethane, 1,2-dichloroethane, perchloroethylene, chlorobenzene, dichlorobenzene, and hexafluoroisopropyl alcohol; an ether-based solvent such as diethyl ether, tetrahydrofuran, and 1,4-dioxane; a nitrile-based solvent such as acetonitrile; a nitrated hydrocarbon-based solvent such as nitromethane, and nitroethane; or various kinds of low boiling point solvents such as water can be used as a mixture thereof.

The polymer concentration in a polymer electrolyte solution to be used is preferably 5 to 40% by weight, and more preferably 10 to 25% by weight. As long as the polymer concentration is in this range, a polymer can be sufficiently filled in voids of a fluorine-containing polymer porous membrane, and further a proton conducting membrane excellent in the surface smoothness can be obtained. When the polymer concentration is extremely low, the filling efficiency of a polymer to voids of a fluorine-containing polymeric porous substrate is lowered, and the immersion treatment may be required to be performed multiple times. On the other hand, when the polymer concentration is extremely high, the solution viscosity becomes extremely high, and a polymer cannot be sufficiently filled in voids of a fluorine-containing polymer porous membrane. Therefore, the filling rate in a composite layer may be lowered or the surface smoothness of a composite electrolyte membrane may be lowered in some cases.

The viscosity of a polymer solution is usually 100 to 50,000 mPa·s, and preferably 500 to 10,000 mPa·s. When the solution viscosity is extremely low, retention of the solution becomes poor and the polymer solution is flown out from the porous membrane when the fluorine-containing polymer porous membrane is immersed in the polymer solution. On the other hand, when the solution viscosity is extremely high, the polymer solution does not permeate into the fluorine-containing polymer porous membrane, and may not be sufficiently impregnated in some cases.

As the support substrate to be used for the membrane forming of a composite polymer electrolyte membrane, known support substrates can be used without any particular limitation, and examples of the support substrate include an endless belt or drum made of a metal such as stainless steel or the like, a film made of a polymer such as polyethylene terephthalate, polyimide, polyphenylene sulfide, or polysulfone, glass, and release paper. It is preferred that a surface of the metal is subjected to mirror surface treatment, or the polymer film is subjected to corona treatment or easy peeling treatment on the surface to be coated, before the use. In addition, in performing continuous coating in a roll state, easy peeling treatment may be applied to the back of the surface to be coated so that the electrolyte membrane is prevented from adhering to the back side of the surface to be coated after being wound. In a film, the thickness is not particularly limited, and is preferably 50 μm to 600 μm from the viewpoint of handling.

As a coating method by casting, a technique such as knife coating, direct roll coating, Meyer bar coating, gravure coating, reverse coating, air knife coating, spray coating, brush application, dip coating, die coating, vacuum die coating, curtain coating, flow coating, spin coating, screen printing, or ink-jet coating can be employed. It is suitably used to improve proton conductivity and improvement of productivity to improve the impregnating property by performing pressure reduction or pressurization at the time of impregnation, heating of a polymer electrolyte solution, heating of a substrate and impregnation atmosphere and the like.

The membrane thickness can be controlled by a coating method. For example, when the coating is performed by a comma coater or a direct coater, the membrane thickness can be controlled by a solution concentration or a thickness of the coating to be applied onto a substrate, and when a slit die coater is used, the membrane thickness can be controlled by a discharge pressure, a nozzle clearance, or a gap between a nozzle and a substrate.

The aromatic hydrocarbon-based electrolyte polymer is preferably combined with a porous membrane in a state that a salt is formed by an ionic group and a cation of an alkali metal or alkaline-earth metal. In this case, by exchanging the cation with a proton after the combining, a composite polymer electrolyte membrane that exhibits proton conductivity can be obtained. That is, the production method including a step of combining the aromatic hydrocarbon-based polymer electrolyte in a state that a salt is formed by an ionic group of the aromatic hydrocarbon-based polymer electrolyte and an cation of an alkali metal or alkaline-earth metal with the fluorine-containing polymer porous membrane, and a step of exchanging the cation of the alkali metal or alkaline-earth metal with a proton in this order is a production method suitable for the composite polymer electrolyte membrane. Although details of the mechanism is unknown, at the time of combining an aromatic hydrocarbon-based polymer electrolyte in a state that a salt is formed by the ionic group and an cation of an alkali metal or alkaline-earth metal with a fluorine-containing polymer porous membrane in which the hydrophilicity is strictly controlled, both of the interfacial energies are balanced with each other and the filling rate in the composite layer is increased, or a uniform phase separation structure is developed in the composite phase.

The step of exchanging the cation with a proton is preferably performed by a step of bringing the membrane after combining into contact with an acid aqueous solution, and as such a step, a step of immersing a membrane in an acid aqueous solution is most preferred. As the acid aqueous solution, sulfuric acid, hydrochloric acid, nitric acid, acetic acid, trifluoromethanesulfonic acid, methanesulfonic acid, phosphoric acid, citric acid or the like can be used without having any particular limitation, but a sulfuric acid aqueous solution is preferably used from the viewpoint of productivity. Further, it is preferred that the concentration of the acid aqueous solution is 3% by weight or more to 30% by weight or less, and the temperature is adjusted to 0° C. or more to 80° C. or less.

When a composite polymer electrolyte membrane having a thickness of 30 μm or less is produced, the mechanical strength at the time of contact and swelling with the aqueous acidic solution is lowered, and membrane breakage tends to be generated, therefore, it is preferred to come into contact with the aqueous acidic solution without removing the membrane material from a support substrate.

The composite polymer electrolyte membrane can be applied to various applications. For example, the composite polymer electrolyte membrane can be applied to a medical application such as an artificial skin, a filtration application, an ion exchange resin application such as a chlorine-resistant reverse osmosis membrane, a various structural material application, an electrochemical application, a humidifying membrane, an anti-fogging membrane, an anti-static membrane, a deoxygenation membrane, a membrane for a solar cell, and a gas barrier membrane. Among them, the composite polymer electrolyte membrane can be used more preferably in various electrochemical applications. As the electrochemical application, for example, applications to a fuel cell, a redox flow cell, a water electrolyzer, a chloralkali electrolyzer, a hydrogen compressor and the like can be mentioned.

The polymer electrolyte fuel cell uses a hydrogen ion conductive polymer electrolyte membrane as an electrolyte membrane, and has a structure of laminating a catalyst layer, an electrode substrate, and a separator in order on both sides of the hydrogen ion conductive polymer electrolyte membrane. Among them, an electrolyte membrane obtained by laminating a catalyst layer on both sides of the electrolyte membrane (that is, a layer structure of a catalyst layer/an electrolyte membrane/a catalyst layer) is referred to as a catalyst-coated membrane (CCM), and further an electrolyte membrane obtained by laminating a catalyst layer and a gas diffusion substrate in order on both sides of the electrolyte membrane (that is, a layer structure of a gas diffusion substrate/a catalyst layer/an electrolyte membrane/a catalyst layer/a gas diffusion substrate) is referred to as a membrane electrode assembly (MEA).

As the method of producing a catalyst-coated membrane, a coating system in which a catalyst layer paste composition to form a catalyst layer is coated on a surface of an electrolyte membrane and dried is commonly performed. However, with the use of this coating system, the electrolyte membrane is swelled and deformed by a solvent contained in the catalyst layer paste composition, and a problem of difficulty in forming a desired catalyst layer on a surface of the electrolyte membrane is generated. To overcome this problem, there has been proposed a method (transfer method) in which only a catalyst layer is prepared in advance on a substrate, and the catalyst layer is transferred to laminate the catalyst layer on an electrolyte membrane (for example, Japanese Patent Laid-open Publication No. 2009-9910).

Our composite polymer electrolyte membrane can be particularly suitably used also as a catalyst-coated membrane due to the high mechanical strength of the composite layer, even in either the above-described coating system or transfer method.

In preparing MEA, there is no particular limitation, and a known method (for example, a chemical plating method described on p. 269, 53, 1985, Electrochemistry, edited by The Electrochemical Society of Japan (J. Electrochem. Soc.); a hot-press joining method for a gas diffusion electrode described on p. 2209, 9, 135, 1988, Electrochemical Science and Technology) can be applied.

When an electrolyte membrane and an electrode substrate are integrated with each other by a press, the temperature and pressure may be appropriately selected depending on the thickness of the electrolyte membrane, the moisture content, the catalyst layer, or the electrode substrate. Further, even when the electrolyte membrane is in a dry state or in a state of water absorption, integration can be performed by a press. Specific examples of the press method include a roll press in which the pressure and the clearance are specified, a flat plate press in which the pressure is specified, and a double belt press in which pressing is performed by the endless belts having elasticity that are opposed to each other and are assembled to multiple rollers. From the viewpoint of the industrial productivity or the suppression of thermal decomposition of a polymer material having an ionic group, these press steps are preferably performed in the range of 0° C. to 250° C. The pressurization is preferably as weak as possible from the viewpoint of the protection of electrolyte membrane and electrode, and in a case of a flat plate press, a pressure of 10 MPa or less is preferred.

In addition, it is also a preferred option to superpose an electrode and an electrolyte membrane to form a fuel cell without performing the integration by a press step from the viewpoint of the prevention of the short circuit of anode and cathode electrodes. In this method, when the power generation is repeated as a fuel cell, deterioration of electrolyte membrane, which is presumed to be caused by the short circuit part, tends to be suppressed, and durability as a fuel cell becomes favorable.

Further, the MEA prepared as described above can be suitably used for other electrochemical applications of a water electrolyzer, a hydrogen compressor and the like.

EXAMPLES

Hereinafter, our membranes, assemblies, fuel cells and methods will be described in more detail with reference to the Examples. However, this disclosure is not limited to the following Examples. Various kinds of measurement conditions are as follows.

(1) Molecular Weight of Polymer Electrolyte Solution

A number average molecular weight and a weight average molecular weight of a polymer solution were measured by gel permeation chromatography (GPC). By using HLC-8022GPC manufactured by Tosoh Corporation as an integrated type device of an ultraviolet detector and a differential refractometer and, further, two columns of TSK gel SuperHM-H manufactured by Tosoh Corporation (with an inner diameter of 6.0 mm, and a length of 15 cm) as a GPC column, a number average molecular weight and a weight average molecular weight were measured at a flow rate of 0.2 mL/min with an N-methyl-2-pyrrolidone solvent (N-methyl-2-pyrrolidone solvent containing 10 mmol/L of lithium bromide), and determined in terms of standard polystyrene.

(2) Measurement of Degree of Hydrophilicity of Fluorine-Containing Polymer Porous Membrane by XPS An outermost surface composition measurement sample was prepared by rinsing a fluorine-containing polymer porous membrane to be a specimen with ultrapure water, and then by drying the resultant fluorine-containing polymer porous membrane at room temperature at 67 Pa for 10 hours. A powder composition measurement sample was prepared as follows: a fluorine-containing polymer porous membrane that had been cut into pieces of 5 mm square in advance was rinsed with ultrapure water; the resultant fluorine-containing polymer porous membrane was dried at room temperature at 67 Pa for 10 hours, and then cooled for 30 minutes with liquid nitrogen; and the resultant cooled fluorine-containing polymer porous membrane was subjected to a treatment for 5 minutes with a freeze pulverizer twice. The composition of each of the prepared samples was measured and the O/F ratio was calculated. Measuring device, and conditions were as follows:
  Measuring device: Quantera SXM
  Excited X-ray: monochromatic Al Kα1 and Kα2 lines (1486.6 eV)
  Diameter of X-ray: 200 μm
  Photoelectron escape angle: 45°
  Ion etching.

(3) Ion Exchange Capacity (IEC)

In accordance with the following procedures, the IEC was measured by a neutralization titration method. The measurement was performed three times, and the average value thereof was set to be the ion exchange capacity.

1. After wiping off the moisture on a membrane surface of the composite polymer electrolyte membrane that had been subjected to proton substitution and had been washed thoroughly with pure water, the composite polymer electrolyte membrane was vacuum dried at 100° C. for 12 hours or more, and the dry weight thereof was determined.
2. A 5 wt % sodium sulfate aqueous solution in a volume of 50 mL was added to an electrolyte, and the resultant mixture left to stand for 12 hours, and subjected to ion exchange.
3. The generated sulfuric acid was titrated by using a 0.01 mol/L aqueous sodium hydroxide solution. As an indicator, 0.1 w/v % of a commercially available phenolphthalein solution for titration was added, and the point at which light reddish purple appeared was set as the end point.
4. IEC was determined by the equation below:

$$IEC(meq/g)=[\text{concentration of aqueous sodium hydroxide solution (mmol/ml)} \times \text{dropping volume (ml)}]/\text{dry weight of sample (g)}.$$

(4) Filling Rate of Aromatic Hydrocarbon-Based Polymer Electrolyte in Composite Layer A cross section of a composite polymer electrolyte membrane was observed by an optical microscope or a scanning electron microscope (SEM). The thickness of a composite layer formed of an aromatic hydrocarbon-based polymer electrolyte and a fluorine-containing polymer porous membrane was set as T1, and when other layers are present on the outside of a composite layer, the thicknesses of the layers were set as T2 and T3, respectively. The specific gravity of the electrolyte polymer to form a composite layer was set as D1, the specific gravities of the electrolyte polymers to form other layers on both sides of a composite layer were set as D2 and D3, respectively, and the specific gravity of a composite polymer electrolyte membrane was set as D. When IECs of the polymers to form respective layers were set as I1, I2, and I3, respectively, and IEC of the composite polymer electrolyte membrane was set as I, the content Y2 (% by volume) of the aromatic hydrocarbon-based polymer electrolyte in the composite layer was determined by the equation below:

$$Y2=[(T1+T2+T3)\times D\times I-(T2\times D2\times I2+T3\times D3\times I3)]/(T1\times D1\times I1)\times 100.$$

(5) Observation of Phase Separation Structure by Transmission Electron Microscope (TEM) Tomography Sample pieces were immersed in a 2 wt % lead acetate aqueous solution as a staining agent, and left to stand at 25° C. for 48 hours to perform the staining treatment. The samples to which the staining treatment had been performed were taken out and embedded in an epoxy resin, and fixed by irradiation with visible light for 30 seconds. Thin pieces of 100 nm in thickness were cut off at room temperature by using an ultramicrotome, and observation was performed in accordance with the following conditions:
  Device: a field emission electron microscope (HRTEM) JEM2100F manufactured by JEOL Ltd.
  Image acquisition: Digital Micrograph
  System: marker method
  Acceleration voltage: 200 kV
  Photographic magnification: 30,000 times
  Inclination angle: +61° to −62°
  Reconstruction resolution: 0.71 nm/pixel.

In three-dimensional reconstruction processing, a marker method was applied. As an alignment marker in performing the three-dimensional reconstruction, Au colloidal particles applied on a collodion membrane were used. By using the marker as the basis, the CT reconstruction processing was performed based on a total of 124 TEM images obtained from a series of continuous inclination images that photographs TEM images by tilting a sample every 1° of inclination in the range of +61° to −62°, and then the three-dimensional phase separation structure was observed.

Further, in the image processing, by using LUZEX (registered trademark) AP (manufactured by NIRECO CORPORATION), the density unevenness correction, the density conversion, and the spatial filter processing were performed in an automatic mode on the TEM original images. In addition, the processed image was expressed in 256 gradations from black to white in an automatic mode of the device, and by defining the 0 to 128 as black and the 129 to 256 as white, a domain including (A1) and a domain containing (A2) were color coded, the distances between respective domains were measured, and then the average value was set as the average distance between domains.

(6) Measurement of Dimensional Change Rate by Hot Water Test

A composite polymer electrolyte membrane was cut into a piece with a square of around 5 cm×around 5 cm, the piece was left to stand for 24 hours under an atmosphere of conditioned temperature and moisture at a temperature of 23° C.±5° C. and a humidity of 50%±5%, and then the length in the MD direction and the length in the TD direction (MD1 and TD1) were measured with a vernier caliper. The electrolyte membrane was immersed in hot water at 80° C. for 8 hours, and then the length in the MD direction and the length in the TD direction (MD2 and TD2) were measured again with a vernier caliper. The dimensional change rates ($\lambda_{MD}$ and $\lambda_{TD}$) in the MD direction and in the TD direction, in the in-plane direction, and the dimensional change rate ($\lambda xy$) (%) in the in-plane direction were calculated by the equations below:

$$\lambda_{MD}=(MD2-MD1)/MD1\times 100$$

$$\lambda_{TD}=(TD2-TD1)/TD1\times 100$$

$$\lambda xy=(\lambda_{MD}+\lambda_{TD})/2.$$

(7) Preparation of Membrane Electrode Assembly (MEA) Using Composite Polymer Electrolyte Membrane A pair of 5 cm square pieces cut from a commercially available electrode, a gas diffusion electrode for a fuel cell manufactured by BASF, "ELAT (registered trademark) LT120ENSI" 5 g/m² Pt was prepared, and the pieces of the obtained pair were superposed opposite to each other to sandwich a composite polymer electrolyte membrane therebetween as a fuel electrode and an oxidation electrode, respectively. The resultant preparation was subjected to heat-pressing at 150° C. and 5 MPa for 3 minutes to obtain an MEA for evaluation.

(8) Power Generation Performance Under Low Humidity Condition

The MEA prepared in the above (7) was set in a JARI standard cell "Ex-1" (with an electrode area of 25 cm$^2$) manufactured by EIWA Corporation, and the current-voltage (I-V) was measured at a cell temperature of 90° C., using hydrogen as a fuel gas and air as an oxidizing gas, at a gas utilization rate of hydrogen 70%/oxygen 40%, under a humidity condition of anode side 30% RH/cathode side 30% RH, and at a back pressure of 0.1 MPa (both sides). The voltage at 1 A/cm$^2$ was read and evaluated.

(9) Wet-Dry Cycle Durability

The MEA prepared in the above (7) was set in a JARI standard cell "Ex-1" (with an electrode area of 25 cm$^2$) manufactured by EIWA Corporation, and a cycle of supplying 160% RH nitrogen to both electrodes for 2 minutes in a state of a cell temperature of 80° C. and then supplying 0% RH nitrogen (dew point of −20° C. or less) to both electrodes for 2 minutes was repeatedly performed. Measurement of a hydrogen permeation amount was performed every 1000 cycles, and the point at which the hydrogen permeation current exceeded 10 times the initial current was set as the wet-dry cycle durability.

In the measurement of hydrogen permeation amount, a test was performed by supplying hydrogen to one electrode as a fuel gas and supplying nitrogen to the other electrode, under a humidity condition of 90% RH hydrogen gas, and 90% RH nitrogen gas. After the retention until the open circuit voltage became 0.2 V or less, the voltage was swept to 0.2 to 0.7 V at 1 mV/sec, and a current value at 0.7 V was set as the hydrogen permeation current.

Synthesis Example 1

Synthesis of 2,2-bis(4-hydroxyphenyl)-1,3-dioxolane (K-DHBP) represented by formula (G1)

Into a 500 ml flask equipped with a stirrer, a thermometer, and a distillation pipe, 49.5 g of 4,4'-dihydroxybenzophenone, 134 g of ethylene glycol, 96.9 g of trimethyl orthoformate, and 0.50 g of p-toluenesulfonic acid monohydrate were charged and dissolved. After that, the resultant mixture was warmed and stirred at 78 to 82° C. for 2 hours. Further, the internal temperature was gradually increased to 120° C., and heating was performed until the distillation of methyl formate, methanol, and trimethyl orthoformate was completely stopped. After cooling this reaction mixture to room temperature, the cooled reaction mixture was diluted with ethyl acetate, and an organic layer was washed with 100 ml of a 5% potassium carbonate aqueous solution. After the liquid separation, the solvent was distilled off. To the residue, 80 ml of dichloromethane was added to precipitate crystals, the precipitated crystals were filtered and dried to obtain 52.0 g of 2,2-bis(4-hydroxyphenyl)-1,3-dioxolane. As a result of gas chromatography (GC) analysis of the crystals, 99.9% of 2,2-bis(4-hydroxyphenyl)-1,3-dioxolane, and 0.1% of 4,4'-dihydroxybenzophenone were found.

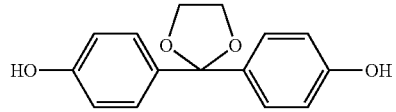

(G1)

Synthesis Example 2

Synthesis of disodium-3,3'-di sulfonate-4,4'-difluorobenzophenone represented by formula (G2)

109.1 Grams of 4,4'-difluorobenzophenone (Aldrich reagent) was reacted at 100° C. for 10 hours in 150 mL of a fuming sulfuric acid (50% SO$_3$) (manufactured by Wako Pure Chemical Industries, Ltd.). After that, the reactant was put into a large amount of water little by little, and the resultant mixture was neutralized with NaOH, and then in the resultant mixture, 200 g of common salt was added to precipitate a synthetic product. The resultant precipitate was filtered out, and recrystallized from an aqueous ethanol solution to obtain disodium-3,3'-disulfonate-4,4'-difluorobenzophenone represented by formula (G2). The purity was 99.3%.

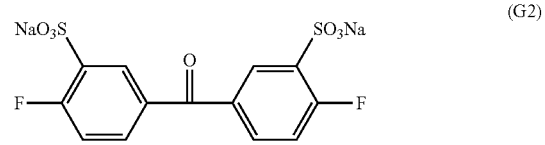

(G2)

Synthesis Example 3

Synthesis of Oligomer not Containing Ionic Group and Represented by Formula (G3)

Into a 1000 mL three-necked flask equipped with a stirrer, a nitrogen introduction pipe, and a Dean-Stark trap, 16.59 g (120 mmol) of potassium carbonate (Aldrich reagent), 25.8 g (100 mmol) of the K-DHBP obtained in Synthesis Example 1 described above, and 20.3 g (93 mmol) of 4,4'-difluorobenzophenone (Aldrich reagent) were placed. After the nitrogen substitution, dehydration was performed in 300 mL of N-methyl pyrrolidone (NMP) and 100 mL of toluene at 160° C., and then the temperature was increased, and the toluene was removed. The polymerization was performed at 180° C. for 1 hour. Reprecipitation was carried out in a large amount of methanol to perform the purification, and an oligomer a1 (with hydroxyl groups at the terminals) not containing an ionic group was obtained. The number average molecular weight was 10000.

Into a 500 mL three-necked flask equipped with a stirrer, a nitrogen introduction pipe, and a Dean-Stark trap, 1.1 g (8 mmol) of potassium carbonate (Aldrich reagent), and 20.0 g (2 mmol) of the above-described oligomer a1 (with hydroxyl groups at the terminals) not containing an ionic group was placed. After the nitrogen substitution, dehydration was performed in 100 mL of N-methyl pyrrolidone (NMP) and 30 mL of toluene at 100° C., and then the temperature was increased, and the toluene was removed. Into the resultant preparation, 4.0 g (12 mmol) of decafluorobiphenyl (Aldrich reagent) was placed, and reaction of the resultant mixture was performed at 105° C. for 1 hour. Reprecipitation was carried out in a large amount of isopropyl alcohol to perform the purification, and an oligomer (with fluoro groups at the terminals) not containing an ionic group and represented by formula (G3) was obtained. The number average molecular weight was 11000.

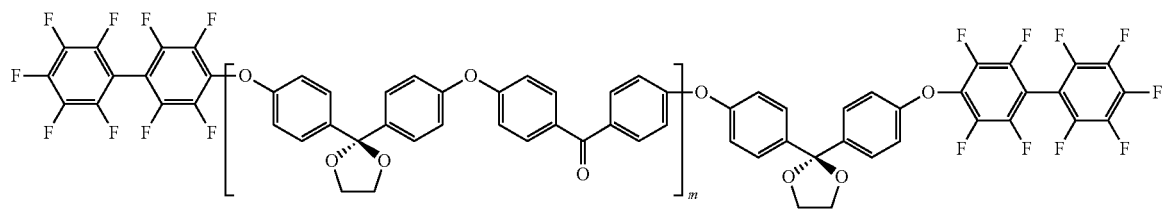

(G3)

Synthesis Example 4

Synthesis of oligomer containing ionic group and represented by formula (G4)

Into a 1000 mL three-necked flask equipped with a stirrer, a nitrogen introduction pipe, and a Dean-Stark trap, 27.6 g (200 mmol) of potassium carbonate (Aldrich reagent), 12.9 g (50 mmol) of the K-DHBP obtained in Synthesis Example 1 described above, and 9.3 g (50 mmol) of 4,4'-biphenol (Aldrich reagent), 39.3 g (93 mmol) of the disodium-3,3'-disulfonate-4,4'-difluorobenzophenone obtained in Synthesis Example 2 described above, and 17.9 g (82 mmol) of 18-crown-6 (manufactured by Wako Pure Chemical Industries, Ltd.) were placed. After the nitrogen substitution, dehydration was performed in 300 mL of N-methyl pyrrolidone (NMP) and 100 mL of toluene at 170° C., and then the temperature was increased, and the toluene was removed. The polymerization was performed at 180° C. for 1 hour. Reprecipitation was carried out in a large amount of isopropyl alcohol to perform the purification, and an oligomer (with hydroxyl groups at the terminals) containing an ionic group and represented by formula (G4) was obtained. The number average molecular weight was 16000.

poured onto 1000 g of crushed ice, and extraction with ethyl acetate was performed. The organic layer was washed with saline, and dried over magnesium sulfate, subsequently ethyl acetate was distilled off to obtain pale yellow crude crystals of 3-(2,5-dichlorobenzoyl) benzene sulfonic acid chloride. The crude crystals were not purified, but used as they are in the next process.

To 300 mL of pyridine, 41.1 g (462 mmol) of 2,2-dimethyl-1-propanol (neopentyl alcohol) was added, and the resultant mixture was cooled to around 10° C. Into the resultant cooled preparation, the crude crystals obtained in the above were gradually added over around 30 minutes. After the entire amount was added, the resultant mixture was further stirred for 30 minutes and reacted. After the reaction, the reaction mixture was poured into 1000 mL of hydrochloric acid water, and the precipitated solid was recovered. The obtained solid was dissolved in ethyl acetate, and washed with an aqueous sodium hydrogen carbonate solution and saline. Subsequently, the resultant preparation was dried over magnesium sulfate, and then the ethyl acetate was distilled off to obtain crude crystals. The obtained crude crystals were recrystallized from methanol to obtain white crystals of 3-(2,5-dichlorobenzoyl) benzenesulfonic acid neopentyl represented by formula G5.

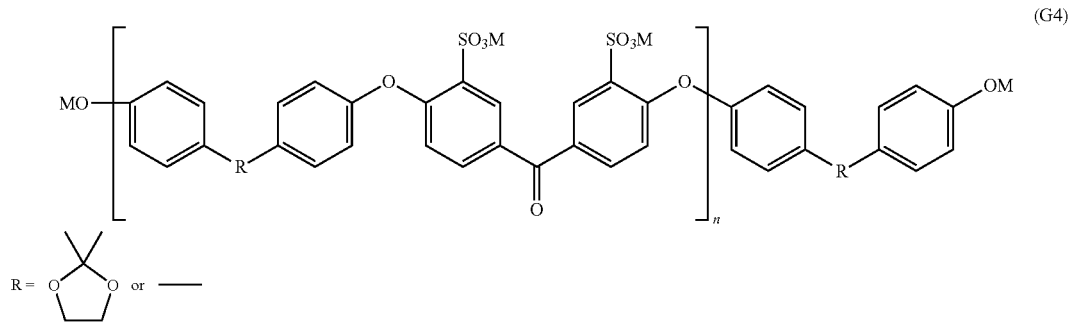

(G4)

In formula (G4), M represents Na or K.

Synthesis Example 5

Synthesis of 3-(2,5-dichlorobenzoyl) benzenesulfonic acid neopentyl represented by formula (G5)

Into a three-necked flask equipped with a stirrer, and a cooling pipe, 245 g (2.1 mol) of chlorosulfonic acid was added, and subsequently, 105 g (420 mmol) of 2,5-dichlorobenzophenone was added. Reaction of the resultant mixture was performed in an oil bath at 100° C. for 8 hours. After a predetermined time, the reaction mixture was slowly

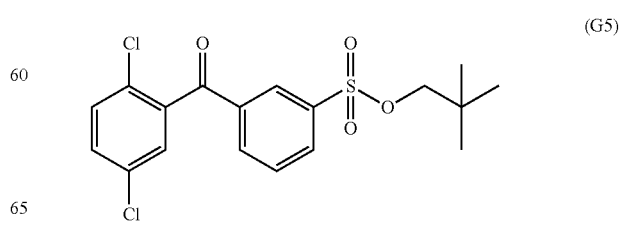

(G5)

Synthesis Example 6

Synthesis of oligomer not containing ionic group and represented by formula (G6)

Into a 1 L three-necked flask equipped with a stirrer, a thermometer, a cooling pipe, a Dean-Stark trap, and a three-way cock for introducing nitrogen, 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed out. After the nitrogen substitution, into the resultant preparation, 346 ml of sulfolane and 173 ml of toluene were added, and stirring was performed. While dipping the flask in an oil bath, the resultant mixture was heated under reflux at 150° C. When the reaction was conducted while removing the water generated by the reaction to the outside of the system through the Dean-Stark trap as an azeotrope with toluene, the generation of water was not almost observed in around 3 hours. While gradually increasing the reaction temperature, most of the toluene was removed, and then the reaction was continued at 200° C. for 3 hours. Next, into the reactant, 12.3 g (0.072 mol) of 2,6-dichlorobenzonitrile was added, and the reaction was conducted further for 5 hours.

The resultant reaction mixture was allowed to cool down, and then to the cooled reaction mixture, 100 mL of toluene was added to dilute the mixture. The precipitate of by-produced inorganic compounds was removed by filtration, and the filtrate was put into 2 L of methanol. A precipitated product was filtered out, recovered and dried, and then dissolved in 250 ml of tetrahydrofuran. This was reprecipitated in 2 L of methanol, and 107 g of a desired compound represented by formula (G6) was obtained. The number average molecular weight was 11000.

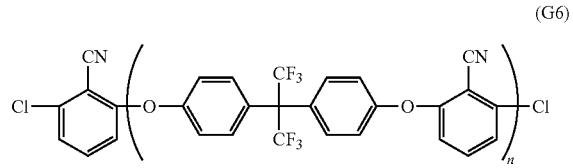

(G6)

Synthesis Example 7

Synthesis of tetrasodium 3,5,3',5'-tetrasulfonate-4,4'-difluorobenzophenone represented by formula (G7)

Into a 1000 mL three-necked flask equipped with a stirrer, and a concentration pipe, 109.1 g of 4,4'-difluorobenzophenone (Aldrich reagent), and 210 mL of fuming sulfuric acid (60% $SO_3$, Aldrich reagent) were added. The reaction was conducted at 180° C. for 24 hours while flowing nitrogen vigorously toward a nitrogen introduction pipe connected to the upper part of the concentration pipe, and a bubbler turning toward the outside of the system. At this time, evaporation of sulfur trioxide was suppressed by flowing nitrogen vigorously. The reactant was put into a large amount of water little by little, and was neutralized with NaOH, and then sodium sulfate was precipitated three times with ethanol and removed, and a sulfonic acid group-containing aromatic compound represented by formula (G7) was obtained. The structure was confirmed by 1H-NMR. Any raw material, disulfonated product, or trisulfonated product was not observed at all, and a tetrasulfonated product with high purity was able to be obtained.

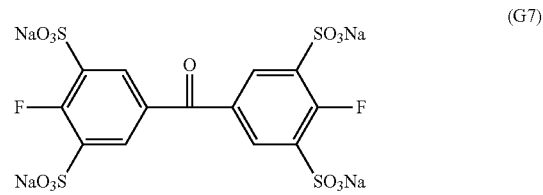

(G7)

Synthesis Example 8

Synthesis of oligomer containing sulfonic acid group and represented by formula (G8)

Into a 1000 mL three-necked flask equipped with a stirrer, a nitrogen introduction pipe, and a Dean-Stark trap, 41.5 g (300 mmol) of potassium carbonate (Aldrich reagent), 12.9 g (50 mmol) of the K-DHBP obtained in Synthesis Example 1 described above, and 9.3 g (50 mmol) of 4,4'-biphenol (Aldrich reagent), 58.3 g (93 mmol) of the sulfonic acid group-containing aromatic compound obtained in Example 7 described above, and 49.1 g (186 mmol) of 18-crown-6 (manufactured by Wako Pure Chemical Industries, Ltd.) were placed. After the nitrogen substitution, dehydration was performed in 400 mL of N-methyl pyrrolidone (NMP) and 150 mL of toluene at 170° C., and then the temperature was increased, and the toluene was removed. The polymerization was performed at 220° C. for 1 hour. Reprecipitation was carried out in a large amount of isopropyl alcohol to perform the purification, and an oligomer (with hydroxyl groups at the terminals) containing a sulfonic acid group and represented by formula (G8) was obtained. The number average molecular weight was 16000.

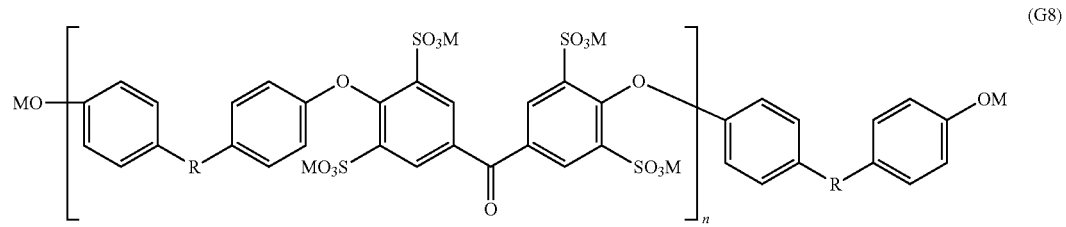

(G8)

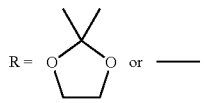

In formula (G8), M represents Na or K.

Synthesis Example 9

Synthesis of polyethersulfone (PES)-based block copolymer precursor including segment represented by formula (G10) and segment represented by formula (G11)

1.62 Grams of anhydrous nickel chloride and 15 mL of dimethyl sulfoxide were mixed, and adjusted to 70° C. Into the resultant mixture, 2.15 g of 2,2'-bipyridyl was added, and stirring was performed at the same temperature for 10 minutes to prepare a nickel-containing solution.

Into a solution obtained by dissolving 1.49 g of 2,5-dichlorobenzenesulfonic acid (2,2-dimethylpropyl) and 0.50 g of SUMIKAEXCEL PES 5200P (manufactured by Sumitomo Chemical Company, Limited, Mn=40,000, and Mw=94,000) represented by the following formula (G9) in 5 mL of dimethyl sulfoxide, 1.23 g of zinc powder was added, and the resultant mixture was adjusted to 70° C. Into this mixture, the nickel-containing solution described above was poured, and polymerization reaction was conducted at 70° C. for 4 hours. The reaction mixture was added into 60 mL of methanol, and subsequently into this mixture, 60 mL of 6 mol/L hydrochloric acid was added, and the resultant mixture was stirred for 1 hour. The precipitated solid was separated by filtration, and dried to obtain 1.62 g of grayish white polyarylene containing a segment represented by formula (G10) and a segment represented by formula (G11). The weight average molecular weight was 200000.

condenser with a receiver at the tip, 61.4 g (214 mmol) of 4,4'-dichlorodiphenyl sulfone, 47.8 g (210 mmol) of bisphenol A, and 78.4 g of diphenylsulfone as a polymerization solvent were placed, subsequently the temperature was increased to 180° C. while flowing nitrogen gas in the system, and then 30.1 g of anhydrous potassium carbonate was added, the temperature was gradually increased to 290° C., and the reaction was conducted at 290° C. for 2 hours.

Next, into the resultant mixture, 78.4 g of diphenylsulfone was added, the temperature was lowered to 180° C., and in this mixture, 198 mg of finely-powdered anhydrous potassium carbonate was added, the resultant mixture was stirred for 5 minutes and dispersed. Subsequently, in the resultant dispersed preparation, 500 mg of aluminum hydroxide ("CW-375HT" manufactured by Sumitomo Chemical Company, Limited) was added, and the resultant mixture was stirred for 15 minutes.

After completion of the stirring, methyl chloride gas was blown into the system for 30 minutes, immediately the reaction mixture was subjected to hot filtration at 150° C., aluminum hydroxide residue and potassium carbonate residue were separated by filtration, the filtrate was cooled and solidified, and then pulverization was performed to obtain a powder having a median particle diameter of 400 μm. This powder was extracted and washed twice with 1000 ml of a mixed solvent of acetone and methanol, further washed twice with 1000 ml of water, and then dried at 150° C. to obtain polysulfone in a form of white powder.

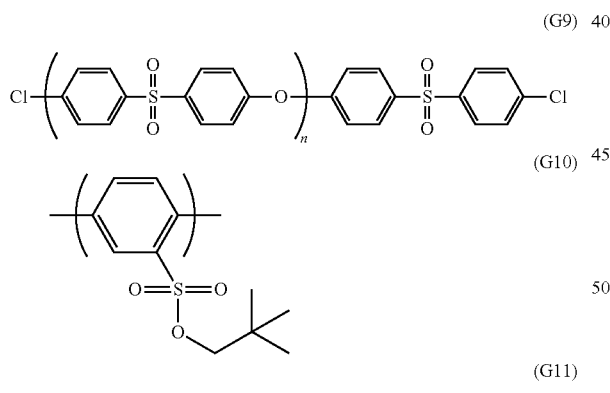

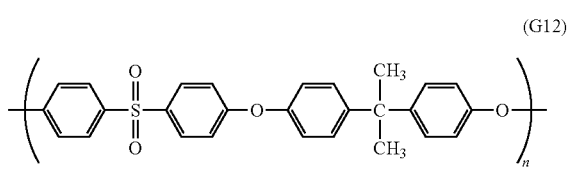

Synthesis Example 10

Synthesis of polysulfone (PSU) represented by formula (G12)

Into a 2000 ml polymerization tank equipped with a stirrer, a nitrogen introduction pipe, a thermometer, and a Production Example 1

Production Example of Polymer Electrolyte Solution a Containing Block Copolymer b1 Including Oligomer Represented by Formula (G4) as Segment (A1) Containing Ionic Group and Oligomer Represented by Formula (G3) as Segment (A2) not Containing Ionic Group Into a 500 mL three-necked flask equipped with a stirrer, a nitrogen introduction pipe, and a Dean-Stark trap, 0.56 g (4 mmol) of potassium carbonate (Aldrich reagent), 16 g (1 mmol) of an oligomer a2 (with hydroxyl groups at the terminals) containing an ionic group was placed. After the nitrogen substitution, dehydration was performed in 100 mL of N-methyl pyrrolidone (NMP) and 30 mL of cyclohexane at 100° C., and then the temperature was increased, and the cyclohexane was removed. Into the resultant preparation, 11 g (1 mmol) of an oligomer a1 (with fluoro groups at the terminals) not containing an ionic group was placed, and reaction of the resultant mixture was performed at 105° C.

for 24 hours. Reprecipitation was carried out in a large amount of isopropyl alcohol to perform the purification, and a block copolymer b1 was obtained. The weight average molecular weight was 340000.

A 5 wt % N-methyl pyrrolidone (NMP) solution in which the obtained block copolymer b1 had been dissolved was subjected to direct centrifugation of the polymerization stock solution with the use of an inverter/compact high speed refrigerated centrifuge manufactured by KUBOTA Corporation (setting an angle rotor RA-800 to Model 6930, and at 25° C. for 30 minutes at a centrifugal force of 20000 G). Since a precipitated solid (cake) and a supernatant (coating liquid) were clearly separated, the supernatant was recovered. Next, the supernatant was distilled at 80° C. under reduced pressure while being stirred, and pressure filtration by using a filter made of polypropylene and having a pore size of 1 μm was performed to obtain a polymer electrolyte solution A. The viscosity of the polymer electrolyte solution A was 1300 mPa·s.

was cooled down to room temperature, and the cooled reactant was poured into 4 L of acetone to be solidified. The solid was collected by filtration, dried in air, and pulverized by a mixer, and then washing was performed with 1500 ml of 1N hydrochloric acid while stirring. After filtration, the product was washed with ion exchanged water until the pH of the washing solution became five or more, and then the resultant product was dried at 80° C. overnight to obtain 23.0 g of a desired polyarylene-based block copolymer. The weight average molecular weight of the polyarylene-based block copolymer after deprotection was 190000. The obtained polyarylene-based block copolymer was dissolved in an organic solvent of N-methyl-2-pyrrolidone/methanol=30/70 (% by mass) to be 0.1 g/g to obtain a polymer electrolyte solution B. The viscosity of the polymer electrolyte solution B was 1200 mPa·s.

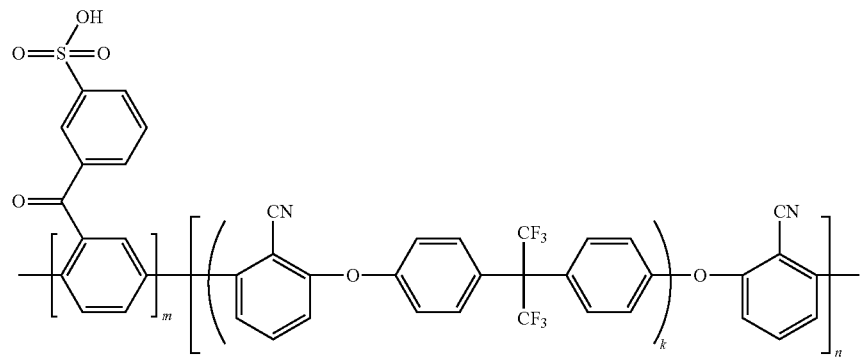

(G13)

Production Example 2

Production Example of Polymer Electrolyte Solution B Including Polyarylene-Based Block Copolymer b2 Represented by Formula (G13)

540 Milliliters of dried N,N-dimethylacetamide (DMAc) was added under nitrogen into a mixture of 135.0 g (0.336 mol) of 3-(2,5-dichlorobenzoyl) benzenesulfonic acid neopentyl, 40.7 g (5.6 mmol) of the oligomer not containing an ionic group, represented by the formula (G6), and synthesized in Synthesis Example 6, 6.71 g (16.8 mmol) of 2,5-dichloro-4'-(1-imidazolyl) benzophenone, 6.71 g (10.3 mmol) of bis(triphenylphosphine) nickel dichloride, 35.9 g (0.137 mol) of triphenylphosphine, 1.54 g (10.3 mmol) of sodium iodide, and 53.7 g (0.821 mol) of zinc.

The reaction system was heated under stirring (heated eventually up to 79° C.), and the reaction was conducted for 3 hours. In the course of the reaction, viscosity increase in the system was observed. The polymerization reaction mixture was diluted with 730 ml of DMAc, and the stirring was performed for 30 minutes. The resultant preparation was filtered by using a pad of celite as a filter aid.

The above-described filtrate was concentrated with an evaporator. Into the concentrated filtrate, 43.8 g (0.505 mol) of lithium bromide was added, and the reaction was conducted at an internal temperature of 110° C. for 7 hours under a nitrogen atmosphere. After the reaction, the reactant Production Example 3

Production Example of Polymer Electrolyte Solution C Including Random Copolymer b3

Into a 5 L reaction vessel equipped with a stirrer, a nitrogen introduction pipe, and a Dean-Stark trap, 129 g of 2,2-bis(4-hydroxyphenyl)-1,3-dioxolane synthesized in Synthesis Example 1, 93 g of 4,4'-biphenol (Aldrich reagent), and 422 g (1.0 mol) of disodium-3,3'-disulfonate-4,4'-difluorobenzophenone synthesized in Synthesis Example 2 were placed. After the nitrogen substitution, into the resultant preparation, 3000 g of N-methyl-2-pyrrolidone (NMP), 450 g of toluene, and 232 g of 18-crown-6 (a reagent manufactured by Wako Pure Chemical Industries, Ltd.) were added. After confirming that all monomers were dissolved, into the mixture, 304 g of potassium carbonate (Aldrich reagent) was added, and the resultant mixture was dehydrated at 160° C. under reflux. After the dehydration, temperature was increased, and the toluene was removed, and desalting polycondensation was performed at 200° C. for 1 hour. The weight average molecular weight was 320000.

Next, a polymerization stock solution was diluted by adding NMP to the polymerization stock solution so that the viscosity of the polymerization stock solution becomes 500 mPa·s. With the use of an inverter/compact high speed refrigerated centrifuge manufactured by KUBOTA Corporation (setting an angle rotor RA-800 to Model 6930, and at 25° C. for 30 minutes at a centrifugal force of 20000 G), direct centrifugation of the polymerization stock solution was performed. Since a precipitated solid (cake) and a supernatant (coating liquid) were clearly separated, the supernatant was recovered. Next, the supernatant was distilled at 80° C. under reduced pressure while being stirred, NMP was removed until the polymer concentration reached 20% by weight, and further pressure filtration by a filter made of polyethylene and having a pore size of 5 μm was performed to obtain a polymer electrolyte solution C. The viscosity of the polymer electrolyte solution C was 1000 mPa·s.

Production Example 4

Production Example of Polymer Electrolyte Solution D Containing Block Copolymer b4 Including Oligomer Represented by Formula (G7) as Segment (A1) Containing Ionic Group and Oligomer Represented by Formula (G3) as Segment (A2) not Containing Ionic Group To a 500 mL three-necked flask equipped with a stirrer, using a nitrogen introduction pipe, and a Dean-Stark trap, 5.5 g of potassium carbonate, 5.2 g of the 2,2-bis(4-hydroxyphenyl)-1,3-dioxane mixture obtained in Synthesis Example 1 described above, 2.2 g of 4,4'-difluorobenzophenone, and 6.3 g of the sulfonic acid group-containing aromatic compound represented by formula (G7) and obtained in Example 8 described above, 2.6 g of 18-crown-6-ether, dehydration was performed at 180° C. in 50 mL of N-methyl pyrrolidone (NMP)/40 mL of toluene, and then the temperature was increased, and the toluene was removed. The polymerization was performed at 240° C. for 3 hours. Reprecipitation was carried out in a large amount of water to perform the purification, and a precursor polymer having a ketal group was obtained. The weight average molecular weight was 220000.

Next, a polymerization stock solution was diluted by adding NMP to the polymerization stock solution so that the viscosity of the polymerization stock solution becomes 500 mPa·s. With the use of an inverter/compact high speed refrigerated centrifuge manufactured by KUBOTA Corporation (setting an angle rotor RA-800 to Model 6930, and at 25° C. for 30 minutes at a centrifugal force of 20000 G), direct centrifugation of the polymerization stock solution was performed. Since a precipitated solid (cake) and a supernatant (coating liquid) were clearly separated, the supernatant was recovered. Next, the supernatant was distilled at 80° C. under reduced pressure while being stirred, and further pressure filtration by a filter made of polyethylene and having a pore size of 1 μm was performed to obtain a polymer electrolyte solution D. The viscosity of the polymer electrolyte solution D was 1000 mPa·s.

Production Example 5

Synthesis of Polymer Electrolyte Solution E Including PES-Based Block Copolymer b5 Containing Segment Represented by Formula (G11) and Segment Represented by Formula (G14)

Into a mixed solution of 0.16 g of lithium bromide monohydrate and 8 mL of N-methyl-2-pyrrolidone, 0.23 g of the block copolymer precursor obtained in Synthesis Example 9 was added, and reaction of the resultant mixture was performed at 120° C. for 24 hours. The reaction mixture was poured into 80 mL of 6 mol/L hydrochloric acid, and stirring was performed for 1 hour. The precipitated solid was separated by filtration. The separated solid was dried to obtain a grayish white block copolymer b4 including the segment represented by formula (G11) and the segment represented by formula (G14). The weight average molecular weight of the obtained polyarylene was 180000.

Next, a polymerization stock solution was diluted by adding NMP to the polymerization stock solution so that the viscosity of the polymerization stock solution becomes 500 mPa·s. With the use of an inverter/compact high speed refrigerated centrifuge manufactured by KUBOTA Corporation (setting an angle rotor RA-800 to Model 6930, and at 25° C. for 30 minutes at a centrifugal force of 20000 G), direct centrifugation of the polymerization stock solution was performed. Since a precipitated solid (cake) and a supernatant (coating liquid) were clearly separated, the supernatant was recovered. Next, the supernatant was distilled at 80° C. under reduced pressure while being stirred, and further pressure filtration by a filter made of polyethylene and having a pore size of 5 μm was performed to obtain a polymer electrolyte solution E. The viscosity of the polymer electrolyte solution E was 1000 mPa·s.

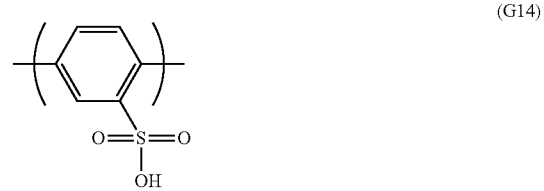

(G14)

Production Example 6

Production Example of Polymer Electrolyte Solution F Containing Block Copolymer b1' Including Oligomer Represented by Formula (G4) as Segment (A1) Containing Ionic Group and Oligomer Represented by Formula (G3) as Segment (A2) not Containing Ionic Group A block copolymer b1' was produced in the similar manner as in Production Example 1 except that the oligomer a2 (with hydroxyl groups at the terminals) containing an ionic group was set to 14 g (0.9 mmol), and the oligomer a1 (with fluoro groups at the terminals) not containing an ionic group was set to 12 g (1.1 mmol). The weight average molecular weight of the block copolymer b1' was 290000. Next, a polymer electrolyte solution F was obtained in the similar manner as in Production Example 1. The viscosity of the polymer electrolyte solution F was 950 mPa·s.

Production Example 7

Production Example of Polymer Electrolyte Precursor Solution G Containing Graft Copolymer b6 Including Side Chain Represented by Formula (G15) as Segment (A1) Containing Ionic Group and Polymer Represented by Formula (G12) as Segment (A2) not Containing Ionic Group In a separable glass container with a cock, 3.0 g of the PSU powder obtained in Synthesis Example 10 was placed, after degassing the glass container, the inside of the glass container was replaced with argon gas. In this situation, PSU powder was irradiated with γ-rays at a dose of 100 kGy from a $^{60}$Co-ray source at room temperature. Subsequently, into this glass container, a solution including 300 g of the p-styrenesulfonic acid sodium degassed by argon gas bubbling and 300 g of isopropyl alcohol was added so that the irradiated PSU powder is immersed. After replaced with argon gas, the glass container was sealed, and left to stand at 80° C. for 12 hours. The obtained graft polymer was washed with isopropyl alcohol and dried.

In 30 g of N-methyl pyrrolidone (NMP), 2 g of the obtained graft polymer was dissolved, and a polymer electrolyte precursor solution G was obtained. The viscosity of the polymer electrolyte precursor solution G was 1300 mPa·s.

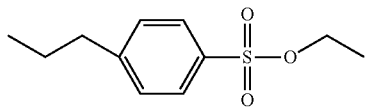 (G15)

Production Example 8

Production Example of Fluorine-Containing Polymer Porous Membrane A

By stretching Poreflon HP-045-30 (manufactured by Sumitomo Electric Fine Polymer, Inc.) by 2.5 times in the longitudinal and lateral directions, a polytetrafluoroethylene porous film with a film thickness of 10 μm and a void content of 80% was prepared. In a glove box with a dew point of −80° C., into a solution including 10 g of a 1% solution of metal sodium-naphthalene complex/tetrahydrofuran (THF) and 90 g of THF, the above-described polytetrafluoroethylene porous film was immersed, taken out after the lapse of three seconds, and immediately washed thoroughly with THF. The O/F ratio on the outermost surface indicating the degree of hydrophilicity of the obtained fluorine-containing polymer porous membrane A was 0.62. The O/F ratio of the powder was 0.28, and the film was a tough film.

Production Example 9

Production Example of Fluorine-Containing Polymer Porous Membrane B

In a glove box with a dew point of −80° C., the polytetrafluoroethylene porous film with a film thickness of 10 μm and a void content of 80%, which had been obtained by stretching Poreflon HP-045-30 (manufactured by Sumitomo Electric Fine Polymer, Inc.) by 2.5 times in the longitudinal and lateral directions, was immersed in a solution including 30 g of a 1% solution of metal sodium-naphthalene complex/THF and 70 g of THF, taken out after the lapse of three seconds, and immediately washed thoroughly with THF. The O/F ratio on the outermost surface indicating the degree of hydrophilicity of the obtained fluorine-containing polymer porous membrane B was 2.33. The O/F ratio of the powder was 1.88, and the film was a tough film.

Production Example 10

Production Example of Fluorine-Containing Polymer Porous Membrane C

The polytetrafluoroethylene porous film with a film thickness of 10 μm and a void content of 80%, which had been obtained by stretching Poreflon HP-045-30 (manufactured by Sumitomo Electric Fine Polymer, Inc.) by 2.5 times in the longitudinal and lateral directions was subjected to plasma treatment. The treatment was performed by using SAMCO RIE N100 where a mixed gas of 3% oxygen/97% argon was adjusted to a pressure of 9.5 Pa, and the treatment was performed for two minutes at an RF output of 10 W. The O/F ratio on the outermost surface indicating the degree of hydrophilicity of the obtained fluorine-containing polymer porous membrane C was 0.32. The O/F ratio of the powder was 0.19, and the film was a tough film.

Production Example 11

Production Example of Fluorine-Containing Polymer Porous Membrane D

The polytetrafluoroethylene porous film with a film thickness of 10 μm and a void content of 80%, which had been obtained by stretching Poreflon HP-045-30 (manufactured by Sumitomo Electric Fine Polymer, Inc.) by 2.5 times in the longitudinal and lateral directions was subjected to plasma treatment. The treatment was performed by using SAMCO RIE N100 where a mixed gas of 1% oxygen/99% argon was adjusted to a pressure of 9.5 Pa, and the treatment was performed for one minute at an RF output of 10 W. The O/F ratio on the outermost surface indicating the degree of hydrophilicity of the obtained fluorine-containing polymer porous membrane D was 0.13. The O/F ratio of the powder was 0.05, and the film was a tough film.

Production Example 12

Production Example of Fluorine-Containing Polymer Porous Membrane E

The polytetrafluoroethylene porous film with a film thickness of 10 μm and a void content of 80%, which had been obtained by stretching Poreflon HP-045-30 (manufactured by Sumitomo Electric Fine Polymer, Inc.) by 2.5 times in the longitudinal and lateral directions, was immersed for one hour in a solution of 20% polyethylene glycol 4000 (a reagent manufactured by Wako Pure Chemical Industries, Ltd.)/80% acetone, taken out, and then dried thoroughly at room temperature. The O/F ratio on the outermost surface indicating the degree of hydrophilicity of the obtained fluorine-containing polymer porous membrane E was 1.53. The O/F ratio of the powder was 0.45, and the film was a tough film.

Example 1

By using a knife coater, the polymer electrolyte solution A produced in Production Example 1 was applied onto a glass substrate by casting, and onto the resultant glass substrate, the fluorine-containing polymer porous membrane A produced in Production Example 8 was bonded. The resultant preparation was kept at room temperature for one hour, impregnated thoroughly with a polymer electrolyte solution A, and then dried at 100° C. for four hours. Onto the top surface of the membrane after being dried, a polymer electrolyte solution A was applied again by casting, the resultant preparation was kept at room temperature for one hour, and dried at 100° C. for four hours to obtain a polymer in a film form. After the immersion in a 10 wt % sulfuric acid aqueous solution at 80° C. for 24 hours for proton substitution, and the deprotection reaction, washing was thoroughly performed by the immersion in a largely excessive amount of pure water for 24 hours to obtain a composite polymer electrolyte membrane (having a membrane thickness of 11 μm).

With regard to the obtained composite polymer electrolyte membrane, an IEC, a filling rate in a composite layer, a ratio λxy of dimensional change rates in the in-plane direction and in the membrane thickness direction, the presence or absence of a phase separation structure and the form and average distance between domains of the phase separation structure, power generation performance under a low humidity condition, and wet-dry cycle durability were evaluated. The evaluation results are shown in Table 1. With regard to the wet-dry cycle durability, since the hydrogen permeation current did not exceed 10 times the initial current even exceeding 20000 cycles, evaluation was terminated at 20000 cycles.

Example 2

A composite polymer electrolyte membrane (having a membrane thickness of 12 μm) was obtained in the similar manner as in Example 1 except that the fluorine-containing polymer porous membrane C prepared in Production Example 10 was used instead of the fluorine-containing polymer porous membrane A.

With respect to the obtained composite polymer electrolyte membrane, an IEC, a filling rate in a composite layer, λxy, the presence or absence of a phase separation structure and the form and average distance between domains of the phase separation structure, power generation performance under a low humidity condition, and wet-dry cycle durability were evaluated. The evaluation results are shown in Table 1. Note that with regard to the wet-dry cycle durability, since the hydrogen permeation current did not exceed 10 times the initial current even exceeding 20000 cycles, evaluation was terminated at 20000 cycles.

Example 3

A composite polymer electrolyte membrane (having a membrane thickness of 14 μm) was obtained in the similar manner as in Example 1 except that the polymer electrolyte solution B prepared in Production Example 2 was used instead of the polymer electrolyte solution A.

Example 4

A composite polymer electrolyte membrane (having a membrane thickness of 11 μm) was obtained in the similar manner as in Example 1 except that the fluorine-containing polymer porous membrane E prepared in Production Example 12 was used instead of the fluorine-containing polymer porous membrane A.

Example 5

A composite polymer electrolyte membrane (having a membrane thickness of 11 μm) was obtained in the similar manner as in Example 1 except that the polymer electrolyte solution D prepared in Production Example 4 was used instead of the polymer electrolyte solution A.

Example 6

A composite polymer electrolyte membrane (having a membrane thickness of 12 μm) was obtained in the similar manner as in Example 1 except that the polymer electrolyte solution E prepared in Production Example 5 was used instead of the polymer electrolyte solution A.

Example 7

A composite polymer electrolyte membrane (having a membrane thickness of 11 μm) was obtained in the similar manner as in Example 1 except that the polymer electrolyte solution F prepared in Production Example 6 was used instead of the polymer electrolyte solution A.

Example 8

A composite polymer electrolyte membrane (having a membrane thickness of 13 μm) was obtained in the similar manner as in Example 1 except that the polymer electrolyte solution G prepared in Production Example 7 was used instead of the polymer electrolyte solution A.

Comparative Example 1

A composite polymer electrolyte membrane (having a membrane thickness of 10 μm) was obtained in the similar manner as in Example 1 except that the fluorine-containing polymer porous membrane B prepared in Production Example 9 was used instead of the fluorine-containing polymer porous membrane A.

Comparative Example 2

A composite polymer electrolyte membrane (having a membrane thickness of 14 μm) was obtained in the similar manner as in Example 1 except that the fluorine-containing polymer porous membrane D prepared in Production Example 11 was used instead of the fluorine-containing polymer porous membrane A.

Comparative Example 3

A composite polymer electrolyte membrane (having a membrane thickness of 11 μm) was obtained in the similar manner as in Example 1 except that the polymer electrolyte solution C prepared in Production Example 3 was used instead of the polymer electrolyte solution A.

Comparative Example 4

By using a knife coater, the polymer electrolyte solution A produced in Production Example 1 was applied onto a glass substrate by casting, and the resultant preparation was dried at 100° C. for four hours without bonding the fluorine-containing polymer porous membrane onto the resultant glass substrate, and a polymer in a film form was obtained. After the immersion in a 10 wt % sulfuric acid aqueous solution at 80° C. for 24 hours for proton substitution, and the deprotection reaction, washing was thoroughly performed by the immersion in a largely excessive amount of pure water for 24 hours to obtain a composite polymer electrolyte membrane (having a membrane thickness of 10 μm).

Comparative Example 5

A composite polymer electrolyte membrane (having a membrane thickness of 12 μm) was obtained in the similar manner as in Example 3 except that the fluorine-containing polymer porous membrane B prepared in Production Example 9 was used instead of the fluorine-containing polymer porous membrane A.

Comparative Example 6

A composite polymer electrolyte membrane (having a membrane thickness of 12 μm) was obtained in the similar manner as in Comparative Example 4 except that the polymer electrolyte solution B prepared in Production Example 2 was used instead of the polymer electrolyte solution A.

Comparative Example 7

A composite polymer electrolyte membrane (having a membrane thickness of 41 μm) was obtained in the similar manner as in Example 1 except that Poreflon WP-045-40 (having a void content of 75% and a membrane thickness of 40 μm, manufactured by Sumitomo Electric Fine Polymer, Inc.) was used instead of the fluorine-containing polymer porous membrane A.

Comparative Example 8

A composite polymer electrolyte membrane (having a membrane thickness of 42 μm) was obtained in the similar manner as in Example 3 except that Poreflon WP-045-40 (having a void content of 75% and a membrane thickness of 40 μm, manufactured by Sumitomo Electric Fine Polymer, Inc.) was used instead of the fluorine-containing polymer porous membrane A.

Constitution of the composite polymer electrolyte membrane prepared in each of Examples and Comparative Examples, and an IEC, a filling rate of a polymer electrolyte in a composite layer, λxy, the presence or absence of a phase separation structure and the form and average distance between domains of the phase separation structure, power generation performance under a low humidity condition, and wet-dry cycle durability were evaluated. The evaluation results are shown in Table 1. With regard to the wet-dry cycle durability, when the hydrogen permeation current did not exceed 10 times the initial current even exceeding 20000 cycles, evaluation was terminated at 20000 cycles.

In Table 1, an example in which the phase separation structure is expressed by "-" means that a clear phase separation structure is not shown.

TABLE 1

| | Aromatic hydrocarbon-based polymer electrolyte | | | Composite electrolyte membrane | | | | | | | |
|---|---|---|---|---|---|---|---|---|---|---|---|
| | | | | Fluorine-containing polymer porous body | | | | | | Power | |
| | Pattern of phase separation structure | Average distance between domains of phase separation structure (nm) | Type | O/F of outermost surface | O/F of powder | Filling rate (%) | IEC (meq/g) | Filling rate (%) | λxy (%) | Weight of eluate with hot water (%) | generation performance under low humidity condition (V) | Wet-dry cycle durability (times) |
| | Type | | | | | | | | | | | |
| Example 1 | A | Co-continuous | 120 | A | 0.62 | 0.28 | 80 | 1.64 | 67 | 4 | 0.3 | 0.63 | >20000 |
| Example 2 | A | Co-continuous | 150 | C | 0.32 | 0.19 | 80 | 1.65 | 66 | 5 | 0.4 | 0.64 | >20000 |
| Example 3 | B | Lamellar | 400 | A | 0.62 | 0.28 | 80 | 1.45 | 67 | 9 | 0.7 | 0.59 | >20000 |
| Example 4 | A | Co-continuous | 130 | E | 1.53 | 0.45 | 80 | 1.60 | 62 | 4 | 0.8 | 0.58 | >20000 |
| Example 5 | D | Co-continuous | 160 | A | 0.62 | 0.28 | 80 | 1.78 | 65 | 8 | 0.4 | 0.66 | >20000 |
| Example 6 | E | Lamellar | 550 | A | 0.62 | 0.28 | 80 | 1.48 | 66 | 9 | 0.9 | 0.57 | >20000 |
| Example 7 | F | Co-continuous | 140 | A | 0.62 | 0.28 | 80 | 1.52 | 68 | 3 | 0.5 | 0.60 | >20000 |
| Example 8 | G | Lamellar | 700 | A | 0.62 | 0.28 | 80 | 1.32 | 64 | 8 | 0.9 | 0.52 | >20000 |
| Comparative Example 1 | A | — | — | B | 2.33 | 1.88 | 80 | 1.57 | 65 | 5 | 0.4 | 0.53 | 19000 |
| Comparative Example 2 | A | Co-continuous | 140 | D | 0.13 | 0.05 | 80 | 1.38 | 48 | 12 | 0.3 | 0.56 | 18000 |
| Comparative Example 3 | C | — | — | A | 0.62 | 0.28 | 80 | 1.44 | 62 | 16 | 0.2 | 0.52 | 17000 |
| Comparative Example 4 | A | Co-continuous | 120 | | | | | 2.22 | — | 21 | 0.3 | 0.68 | 18000 |
| Comparative Example 5 | B | — | — | B | 2.33 | 1.88 | 80 | 1.47 | 66 | 11 | 0.6 | 0.50 | 18000 |
| Comparative Example 6 | B | Lamellar | 450 | | | | | 1.92 | — | 26 | 0.7 | 0.60 | 16000 |
| Comparative Example 7 | A | — | — | Poreflon | 0 | — | 75 | 1.02 | 14 | 12 | 0.4 | 0.41 | 19000 |
| Comparative Example 8 | B | — | — | Poreflon | 0 | — | 75 | 0.95 | 16 | 17 | 0.6 | 0.30 | 16000 |

The invention claimed is:

1. A composite polymer electrolyte membrane comprising:
   a composite layer of an aromatic hydrocarbon-based polymer electrolyte and a fluorine-containing polymer porous membrane, wherein
   a ratio (O/F ratio) of an atomic composition percentage of oxygen O (at %) to an atomic composition percentage of fluorine F (at %) on an outermost surface of the fluorine-containing polymer porous membrane as measured by X-ray photoelectron spectroscopy (XPS) is 0.20 or more to 2.0 or less, and the aromatic hydrocarbon-based polymer electrolyte in the composite layer forms a phase separation structure.

2. The composite polymer electrolyte membrane according to claim 1, wherein an O/F ratio of a powder prepared by freeze pulverizing the fluorine-containing polymer porous membrane is two thirds or less of the O/F ratio on an outermost surface of the fluorine-containing polymer porous membrane as measured by XPS.

3. The composite polymer electrolyte membrane according to claim 1, wherein weight of an eluate with hot water after immersing the composite polymer electrolyte membrane in hot water at 80° C. for one week is 1% or less to weight of the composite electrolyte membrane before hot water immersion.

4. The composite polymer electrolyte membrane according to claim 1, wherein the fluorine-containing polymer porous membrane includes polytetrafluoroethylene.

5. The composite polymer electrolyte membrane according to claim 1, wherein the aromatic hydrocarbon-based polymer electrolyte is a block or graft copolymer in which a segment containing an ionic group and a segment not containing an ionic group are bound to each other.

6. The composite polymer electrolyte membrane according to claim 1, wherein the phase separation structure of the aromatic hydrocarbon-based polymer electrolyte has a co-continuous pattern.

7. The composite polymer electrolyte membrane according to claim 1, wherein the aromatic hydrocarbon-based polymer electrolyte is an aromatic polyether ketone-based polymer having a sulfonic acid group.

8. The composite polymer electrolyte membrane according to claim 1, wherein a content of the aromatic hydrocarbon-based polymer electrolyte in the composite layer is 50% by volume or more.

9. The composite polymer electrolyte membrane according to claim 1, wherein a dimensional change rate in an in-plane direction is 10% or less.

10. A catalyst-coated membrane comprising a catalyst layer attached to the composite polymer electrolyte membrane according to claim 1.

11. A membrane electrode assembly comprising the composite polymer electrolyte membrane according to claim 1.

12. A polymer electrolyte fuel cell comprising the composite polymer electrolyte membrane according to claim 1.

13. A hydrogen compressor comprising the composite polymer electrolyte membrane according to claim 1.

14. A method of producing a composite polymer electrolyte membrane containing a composite layer of an aromatic hydrocarbon-based polymer electrolyte having an ionic group and a fluorine-containing polymer porous membrane, wherein a fluorine-containing polymer porous body having a ratio (O/F ratio) of an element composition of oxygen O (at %) to an element composition of fluorine F (at %) on an outermost surface of 0.20 or more to 2.0 or less as measured by X-ray photoelectron spectroscopy (XPS) is combined with an aromatic hydrocarbon-based polymer electrolyte.

15. The method according to claim 14, comprising:
combining the aromatic hydrocarbon-based polymer electrolyte with the fluorine-containing polymer porous membrane in a state that an ionic group of the aromatic hydrocarbon-based polymer electrolyte forms a salt with an cation of an alkali metal or alkaline-earth metal; and
exchanging the cation of the alkali metal or alkaline-earth metal with a proton, in this order.

* * * * *